(12) United States Patent
Zhao et al.

(10) Patent No.: US 10,461,968 B2
(45) Date of Patent: Oct. 29, 2019

(54) ADJUSTMENT METHOD AND DEVICE FOR EQUALIZER COEFFICIENT, AND COMPUTER STORAGE MEDIUM

(71) Applicant: Sanechips Technology Co., Ltd., Shenzhen, Guangdong (CN)

(72) Inventors: Yaling Zhao, Shenzhen (CN); Junfeng Peng, Shenzhen (CN); Huihui Wan, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 50 days.

(21) Appl. No.: 15/577,263

(22) PCT Filed: Oct. 12, 2015

(86) PCT No.: PCT/CN2015/091788
§ 371 (c)(1),
(2) Date: Nov. 27, 2017

(87) PCT Pub. No.: WO2017/000422
PCT Pub. Date: Jan. 5, 2017

(65) Prior Publication Data
US 2018/0152328 A1 May 31, 2018

(30) Foreign Application Priority Data
Jun. 29, 2015 (CN) .......................... 2015 1 0371532

(51) Int. Cl.
*H03H 7/30* (2006.01)
*H04L 25/03* (2006.01)
*H04B 10/61* (2013.01)

(52) U.S. Cl.
CPC ... *H04L 25/03261* (2013.01); *H04B 10/6166* (2013.01); *H04L 25/03* (2013.01);
(Continued)

(58) Field of Classification Search
CPC .............. H04L 25/03261; H04L 25/03; H04L 25/03044; H04L 25/0328;
(Continued)

(56) References Cited

U.S. PATENT DOCUMENTS

| 6,784,745 B2 | 8/2004 | Richardson |
| 7,039,330 B2 | 5/2006 | Lenosky |

(Continued)

FOREIGN PATENT DOCUMENTS

| CN | 101425851 A | 5/2009 |
| CN | 101432975 A | 5/2009 |

(Continued)

OTHER PUBLICATIONS

International Search Report in international application No. PCT/CN2015/091788, dated Apr. 6, 2016.
(Continued)

*Primary Examiner* — Zewdu A Kassa
(74) *Attorney, Agent, or Firm* — Ling Wu; Stephen Yang; Ling and Yang Intellectual Property

(57) ABSTRACT

A jones matrix is obtained using coefficients of an equalizer; a parameter of the jones matrix is obtained; a coefficient of an X axis polarization state or a Y axis polarization state in the coefficients is adjusted using the parameter of the jones matrix when the coefficients have singularity characteristics, or energy corresponding to each coefficient of X or Y axis polarization state under each order of a filter in the equalizer is determined using two coefficients of an X or Y axis polarization state in the equalizer coefficients; and a central position of a coefficient tap of X or Y axis polarization state of the equalizer is adjusted using the energy corresponding to each coefficient of X or Y axis polarization state under
(Continued)

each order of the filter when the coefficient tap of the X axis or Y axis polarization state of the equalizer deviates from the central position.

20 Claims, 11 Drawing Sheets

(52) U.S. Cl.
CPC .... *H04L 25/0328* (2013.01); *H04L 25/03044* (2013.01); *H04L 2025/0363* (2013.01); *H04L 2025/03808* (2013.01)

(58) Field of Classification Search
CPC .. H04L 2025/0363; H04L 2025/03808; H04B 10/6166
USPC ....... 375/233, 232, 231, 230, 229, 316, 219, 375/295
See application file for complete search history.

(56) References Cited

U.S. PATENT DOCUMENTS

| | | | |
|---|---|---|---|
| 2004/0150478 A1 | 8/2004 | Richardson | |
| 2005/0078779 A1 | 4/2005 | Lenosky | |
| 2012/0134684 A1 | 5/2012 | Koizumi | |
| 2012/0148266 A1 | 6/2012 | Komaki | |
| 2012/0230676 A1 | 9/2012 | Mo | |
| 2014/0328585 A1* | 11/2014 | Arikawa | H04B 10/616 398/25 |

FOREIGN PATENT DOCUMENTS

| | | |
|---|---|---|
| CN | 103441972 A | 12/2013 |
| CN | 103516648 A | 1/2014 |
| CN | 103634049 A | 3/2014 |
| CN | 103825851 A | 5/2014 |
| CN | 103840883 A | 6/2014 |
| CN | 104079379 A | 10/2014 |
| CN | 104280737 A | 1/2015 |
| DE | 69838759 T2 | 10/2008 |
| EP | 2464069 A2 | 6/2012 |
| EP | 2763366 A2 | 8/2014 |

OTHER PUBLICATIONS

English Translation of the Written Opinion of the International Search Authority in international application No. PCT/CN2015/091788, dated Apr. 6, 2016.
Li, Guohua; Xiao, Shengan; Li, Jizhong: "Study on Polarization Effect of Optical System", Acta Optica Sinica, vol. 12, No. 12, Dec. 31, 1992 (Dec. 31, 1992).
Supplementary European Search Report in European application No. 15896952.7, dated May 9, 2018.
Lau Alan Pak et al:"Advanced DSP Techniques Enabling High Spectral Efficiency and Flexible Transmissions: Toward Elastic Optical Network", IEEE Signal Processing Magazine, IEEE Service Center, Piscataway, NJ, US, vol. 31, No. 2, Mar. 1, 2014 (Mar. 1, 2014), pp. 82-92, XP011539829, ISSN: 1053-5888, d01: 10.1109/MSP.2013.2287021 [retrieved on Feb. 12, 2014].
Ling Liu et al:"Initial tap setup of constant modulus algorithm for polarization de-multiplexing in optical coherent receivers", Optical Fiber Communication—Incudes Post Deadline Papers, 2009. OFC 2009. Conference on, IEEE, Piscataway, NJ, USA, Mar. 22, 2009 (Mar. 22, 2009), p. 1-3, XP031467742, ISBN: 978-1-4244-2606-5.
Valery N. Rozental et al:"Experimental analysis of singulanty-avoidance techniques for CMA equalization in DP-QPSK 112-Gb/s optical systems", Optics express, Sep. 12, 2011 (Sep. 12, 2011), pp. 18655-2126, XP055471097, United States DOI: 10.1364/OE.19. 018655 Retrieved from the Internet: URL: https://www.osapublishing.org/DirectPDFAccess/1855B6EF-BAAB-3065-0B24E6A0244C6A5_C_222428/oe-19-19-18655.pdf?da=1&id=222428 &seq=0&mobile=no.

* cited by examiner

ADJUSTMENT METHOD AND DEVICE FOR EQUALIZER COEFFICIENT, AND COMPUTER STORAGE MEDIUM

TECHNICAL FIELD

The present disclosure relates to communication via optical transmission, and in particular to a method and device for adjusting a coefficient of an equalizer, and a computer-readable storage medium.

BACKGROUND

No ideal transmission characteristics may be achieved in an actual communication system due to a change in channel characteristics and an error in filter design. There may be inter-symbol crosstalk at a sampling point, leading to degraded system performance. To reduce impact of inter-symbol crosstalk, system characteristics are to be corrected or compensated, generally by including, in a communication system, a tunable filter. Such a compensating filter may be referred to as an equalizer. An equalizer in a communication system is a device for correcting amplitude-frequency characteristics and phase-frequency characteristics of a transmission channel.

Little or no control over a coefficient of an equalizer is involved in existing equalization for a high-speed optical transmission system. A coefficient of an equalizer is a crucial factor in system stability.

With an existing solution for adjusting a coefficient of an equalizer, both coefficients of X-axis and Y-axis polarizations may be shifted in a same direction, such that a center of the coefficients of X-axis and Y-axis polarizations may not be adjusted to a central position of taps of coefficients, impacting system stability.

SUMMARY

Embodiments herein provide a method and device for adjusting a coefficient of an equalizer, and a computer-readable storage medium.

According to an embodiment herein, a method for adjusting a coefficient of an equalizer includes:

acquiring a jones matrix with coefficients of an equalizer;
acquiring a parameter of the jones matrix; and
in response to determining, using the parameter of the jones matrix, that the coefficients are of singularity characteristics, adjusting a coefficient of X-axis or Y-axis polarization among the coefficients.

The acquiring a parameter of the jones matrix may include:

acquiring, by performing a mathematical operation on the jones matrix, a first parameter, a second parameter, and a third parameter. The first parameter may represent strength of a signal of X-axis polarization. The second parameter may represent strength of a signal of Y-axis polarization. The third parameter may represent an angle between the signal of X-axis polarization and the signal of Y-axis polarization.

The determining, using the parameter of the jones matrix, that the coefficients are of singularity characteristics may include:

determining whether the third parameter is less than a first threshold; in response to determining that the third parameter is less than the first threshold, determining that the coefficients are of singularity characteristics; alternatively, acquiring a first value by summing over N instances of the third parameter, the N being an integer greater than 1; determining whether the first value is less than a second threshold; in response to determining that the first value is less than the second threshold, determining that the coefficients are of singularity characteristics.

The method may further include: in response to determining that the coefficients are of singularity characteristics, before the adjusting a coefficient of X-axis or Y-axis polarization among the coefficients, generating a warning of singularity.

The adjusting a coefficient of X-axis or Y-axis polarization among the coefficients may include:

in response to determining that the first parameter is greater than the second parameter, performing singularity alteration on the coefficient of X-axis polarization, and setting the coefficient of X-axis polarization having gone through the singularity alteration as the coefficient of Y-axis polarization; alternatively, in response to determining that the first parameter is less than the second parameter, performing singularity alteration on the coefficient of Y-axis polarization, and setting the coefficient of Y-axis polarization having gone through the singularity alteration as the coefficient of X-axis polarization.

The performing singularity alteration on the coefficient of X-axis polarization, and setting the coefficient of X-axis polarization having gone through the singularity alteration as the coefficient of Y-axis polarization may include:

$Hyy(1,col)=\text{conj}(Hxx(1,n+1-col))$;

$Hyx(1,col)=-\text{conj}(Hxy(1,n+1-col))$.

The conj may represent conjugation. The n may represent an order of a filter in the equalizer. The col may take on a value of 1, 2, . . . , or n.

The performing singularity alteration on the coefficient of Y-axis polarization, and setting the coefficient of Y-axis polarization having gone through the singularity alteration as the coefficient of X-axis polarization may include:

$Hxx(1,col)=\text{conj}(Hyy(1,n+1-col))$;

$Hxy(1,col)=-\text{conj}(Hyx(1,n+1-col))$.

The conj may represent conjugation. The n may represent an order of a filter in the equalizer. The col may take on a value of 1, 2, . . . , or n.

The method may further include:

determining, using two coefficients of X-axis or Y-axis polarization among the coefficients of the equalizer, strength corresponding to a coefficient of X axis or Y-axis polarization of an order of a filter in the equalizer; and in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

The in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer may include:

setting a third parameter as a maximal strength found by searching strength corresponding to a first coefficient of X axis or Y-axis polarization of an order of the filter, and setting a fourth parameter as a first position index corresponding to the third parameter;

setting a fifth parameter as a maximal strength found by searching strength corresponding to a second coefficient of X axis or Y-axis polarization of an order of the filter, and setting a sixth parameter as a second position index corresponding to the fifth parameter; and in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps, the M being an integer no less than 1.

The in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps may include:

in response to determining that both the fourth and sixth parameters are no greater than a third threshold and both the third and fifth parameters are greater than a fifth threshold, moving the central position of taps of coefficients of X axis or Y-axis polarization of the equalizer to the right by M taps; alternatively, in response to determining that both the fourth and sixth parameters are no less than a fourth threshold and both the third and fifth parameters are greater than the fifth threshold, moving the central position of taps of coefficients of X axis or Y-axis polarization of the equalizer to the left by M taps.

According to an embodiment herein, a method for adjusting a coefficient of an equalizer includes:

determining, using two coefficients of X-axis or Y-axis polarization among coefficients of the equalizer, strength corresponding to a coefficient of X axis or Y-axis polarization of an order of a filter in the equalizer; and in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

The in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer may include:

setting a third parameter as a maximal strength found by searching strength corresponding to a first coefficient of X axis or Y-axis polarization of an order of the filter, and setting a fourth parameter as a first position index corresponding to the third parameter;

setting a fifth parameter as a maximal strength found by searching strength corresponding to a second coefficient of X axis or Y-axis polarization of an order of the filter, and setting a sixth parameter as a second position index corresponding to the fifth parameter; and in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps, the M being an integer no less than 1.

The in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps may include:

in response to determining that both the fourth and sixth parameters are no greater than a third threshold and both the third and fifth parameters are greater than a fifth threshold, moving the central position of taps of coefficients of X axis or Y-axis polarization of the equalizer to the right by M taps; alternatively, in response to determining that both the fourth and sixth parameters are no less than a fourth threshold and both the third and fifth parameters are greater than the fifth threshold, moving the central position of taps of coefficients of X axis or Y-axis polarization of the equalizer to the left by M taps.

According to an embodiment herein, a device for adjusting a coefficient of an equalizer includes a first jones matrix acquiring module, a first parameter acquiring module, and a first adjusting module.

The first jones matrix acquiring module is arranged for acquiring a jones matrix with coefficients of an equalizer.

The first parameter acquiring module is arranged for acquiring a parameter of the jones matrix.

The first adjusting module is arranged for in response to determining, using the parameter of the jones matrix, that the coefficients are of singularity characteristics, adjusting a coefficient of X-axis or Y-axis polarization among the coefficients.

The device may further include a first warning module arranged for: in response to determining that the coefficients are of singularity characteristics, before the coefficient of X-axis or Y-axis polarization among the coefficients is adjusted, generating a warning of singularity.

The device may further include a first strength determining module and a second adjusting module.

The first strength determining module may be arranged for determining, using two coefficients of X-axis or Y-axis polarization among the coefficients of the equalizer, strength corresponding to a coefficient of X axis or Y-axis polarization of an order of a filter in the equalizer.

The second adjusting module may be arranged for: in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

According to an embodiment herein, a device for adjusting a coefficient of an equalizer includes a second strength determining module and a third adjusting module.

The second strength determining module is arranged for: determining, using two coefficients of X-axis or Y-axis polarization among coefficients of the equalizer, strength corresponding to a coefficient of X axis or Y-axis polarization of an order of a filter in the equalizer.

The third adjusting module is arranged for: in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

The third adjusting module may further include a second parameter acquiring module, a third parameter acquiring module, and a center adjusting module.

The second parameter acquiring module may be arranged for: setting a third parameter as a maximal strength found by searching strength corresponding to a first coefficient of X axis or Y-axis polarization of an order of the filter, and setting a fourth parameter as a first position index corresponding to the third parameter.

The third parameter acquiring module may be arranged for setting a fifth parameter as a maximal strength found by searching strength corresponding to a second coefficient of X axis or Y-axis polarization of an order of the filter, and setting a sixth parameter as a second position index corresponding to the fifth parameter.

The center adjusting module may be arranged for: in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps, the M being an integer no less than 1.

According to an embodiment herein, a computer-readable storage medium stores therein instructions which when being executed, cause at least one processor to execute the method for adjusting a coefficient of an equalizer.

With the method and device for adjusting a coefficient of an equalizer as well as the computer-readable storage medium according to embodiments herein, a jones matrix is acquired with coefficients of an equalizer; a parameter of the jones matrix is acquired using the jones matrix; when it is determined, using the parameter of the jones matrix, that the coefficients are of singularity characteristics, a coefficient of X-axis or Y-axis polarization among the coefficients is adjusted; and/or, strength corresponding to a coefficient of X axis or Y-axis polarization of an order of a filter in the equalizer is determined using two coefficients of X-axis or Y-axis polarization among coefficients of the equalizer; and when it is determined, using the strength corresponding to a coefficient of X axis or Y-axis polarization of an order of the filter, that a central position of taps of coefficients of X axis or Y-axis polarization of the equalizer has deviated, the central position of taps of coefficients of X axis or Y-axis polarization of the equalizer is adjusted. Only a coefficient of X-axis or Y-axis polarization is adjusted, such that both centers of the coefficients of X-axis and Y-axis polarizations may be adjusted to a central position of taps of coefficients. Thus, the coefficients of the equalizer may be adjusted accurately, thereby improving filter performance and system stability.

BRIEF DESCRIPTION OF THE DRAWINGS

In the drawings (not necessarily to scale), like reference signs may represent like parts in different views. Like reference signs with different letter suffixes may represent different examples of like parts. The drawings generally show various embodiments discussed herein in an exemplary non-limiting way.

DETAILED DESCRIPTION

The present disclosure is further elaborated below with reference to drawings and embodiments.

In embodiments herein, a jones matrix is acquired with coefficients of an equalizer; a parameter of the jones matrix is acquired using the jones matrix; when it is determined, using the parameter of the jones matrix, that the coefficients are of singularity characteristics, a coefficient of X-axis or Y-axis polarization among the coefficients is adjusted; and/or, strength corresponding to a coefficient of X axis or Y-axis polarization of an order of a filter in the equalizer is determined using two coefficients of X-axis or Y-axis polarization among coefficients of the equalizer; and when it is determined, using the strength corresponding to a coefficient of X axis or Y-axis polarization of an order of the filter, that a central position of taps of coefficients of X axis or Y-axis polarization of the equalizer has deviated, the central position of taps of coefficients of X axis or Y-axis polarization of the equalizer is adjusted.

Figure 1:
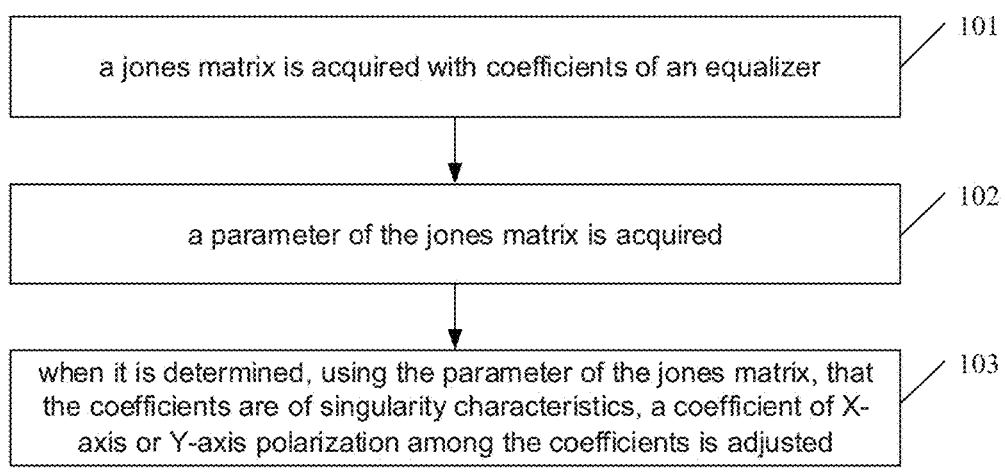
FIG. 1 is a flowchart of a method for adjusting a coefficient of an equalizer according to an embodiment herein.

As shown in FIG. 1, a method for adjusting a coefficient of an equalizer according to an embodiment herein includes steps as follows.

In step 101, a jones matrix is acquired with coefficients of an equalizer.

Figure 2:
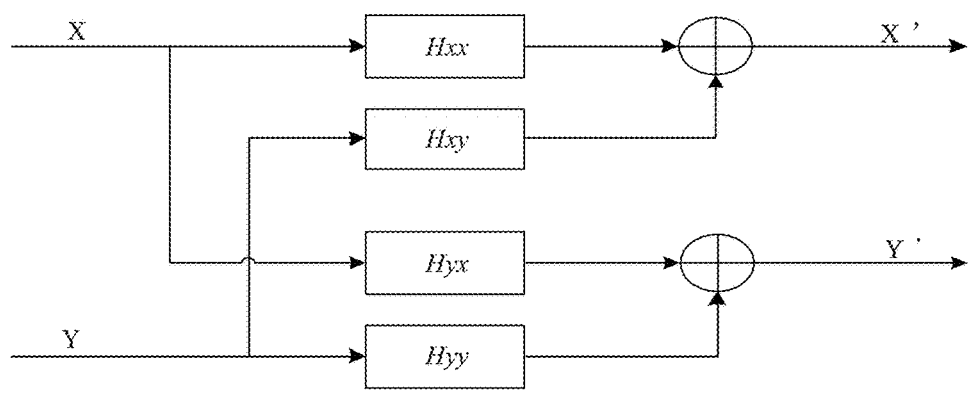
FIG. 2 is a diagram of a filter of a butterfly-shaped structure according to an embodiment herein.

In an actual application, as shown in FIG. 2, X and Y may be two polarized signals, respectively. Modulation by polarization multiplexing may be used in a communication system. A polarized signal may deviate during transmission, causing interference to another polarized signal. To cancel such interference, a filter of a butterfly-shaped structure is to be used to implement polarization demultiplexing. The butterfly filter may be implemented by four Finite Impulse Response (FIR) filters. The coefficients of the equalizer may include Hxx (f), Hxy (f), Hyy (f), and Hyx (f). The jones matrix may be $$\begin{bmatrix} h_{xx}(f) & h_{xy}(f) \\ h_{yx}(f) & h_{yy}(f) \end{bmatrix}.$$

In step 102, a parameter of the jones matrix is acquired using the jones matrix.

A first parameter, a second parameter, and a third parameter may be acquired by performing a mathematical operation on the jones matrix. The first parameter may represent strength of a signal of X-axis polarization. The second parameter may represent strength of a signal of Y-axis polarization. The third parameter may represent an angle between the signal of X-axis polarization and the signal of Y-axis polarization.

With the jones matrix, the first parameter may be expressed by a formula as follows.

$$\text{jones\_}x=|\text{jones}(1,1)|^2+|\text{jones}(1,2)|^2 \quad (1)$$

The second parameter may be expressed by a formula as follows.

$$\text{jones\_}y=|\text{jones}(2,1)|^2+|\text{jones}(2,2)|^2 \quad (2)$$

The third parameter may be expressed by a formula as follows.

$$\text{jones\_val} = |\text{jones}(1,1)^*\text{jones}(2,2) - \text{jones}(1,2)^*\text{jones}(2,1)|^2 \quad (3)$$

$$\text{jones}(1,1) = \sum_{col=1}^{n} Hxx(1,col).$$

$$\text{jones}(1,2) = \sum_{col=1}^{n} Hxy(1,col).$$

$$\text{jones}(2,1) = \sum_{col=1}^{n} Hyx(1,col).$$

$$\text{jones}(2,2) = \sum_{col=1}^{n} Hyy(1,col).$$

The n may represent an order of a filter in the equalizer. The col may take on a value of 1, 2, . . . , or n.

In step 103, when it is determined, using the parameter of the jones matrix, that the coefficients are of singularity characteristics, a coefficient of X-axis or Y-axis polarization among the coefficients is adjusted.

When the coefficients are of singularity characteristics, a signal of X-axis polarization and a signal of Y-axis polarization may converge to each other in terms of polarization.

It may be determined as follows using the parameter of the jones matrix, that the coefficients are of singularity characteristics.

It may be determined whether the third parameter is less than a first threshold. When the third parameter is less than the first threshold, it may be determined that the coefficients are of singularity characteristics.

The first threshold may be set using a result of simulation.

It may be determined as follows using the parameter of the jones matrix, that the coefficients are of singularity characteristics.

A first value may be acquired by summing over N acquired instances of the third parameter. The N may be an integer greater than 1. It may be determined whether the first value is less than a second threshold. When the first value is less than the second threshold, it may be determined that the coefficients are of singularity characteristics.

There may be major fluctuation among individual instances of the third parameter. By summing over instances of the third parameter, it may be determined, with increased accuracy, whether the coefficients are of singularity characteristics.

The second threshold may be set using a result of simulation.

With the jones matrix, the first value may be expressed by a formula as follows.

$$\text{jones\_val\_sum} = \sum_{cnt=1}^{N} \text{jones\_val}_{cnt} \quad (4)$$

A coefficient of X-axis or Y-axis polarization among the coefficients may be adjusted as follows.

When the first parameter is greater than the second parameter, singularity alteration may be performed on the coefficient of X-axis polarization. The coefficient of X-axis polarization having gone through the singularity alteration may be set as the coefficient of Y-axis polarization.

Alternatively, when the first parameter is less than the second parameter, singularity alteration may be performed on the coefficient of Y-axis polarization. The coefficient of Y-axis polarization having gone through the singularity alteration may be set as the coefficient of X-axis polarization.

Singularity alteration may be performed on the coefficient of X-axis polarization, and the coefficient of X-axis polarization having gone through the singularity alteration may be set as the coefficient of Y-axis polarization as follows.

$$Hyy(1,col)=\text{conj}(Hxx(1,n+1-col)).$$

$$Hyx(1,col)=-\text{conj}(Hxy(1,n+1-col)).$$

The conj may represent conjugation. The n may represent an order of a filter in the equalizer. The col may take on a value of 1, 2, . . . , or n.

Singularity alteration may be performed on the coefficient of Y-axis polarization, and the coefficient of Y-axis polarization having gone through the singularity alteration may be set as the coefficient of X-axis polarization as follows.

$$Hxx(1,col)=\text{conj}(Hyy(1,n+1-col)).$$

$$Hxy(1,col)=-\text{conj}(Hyx(1,n+1-col)).$$

The conj may represent conjugation. The n may represent an order of a filter in the equalizer. The col may take on a value of 1, 2, . . . , or n.

When the coefficients are of singularity characteristics, before a coefficient of X-axis or Y-axis polarization among the coefficients is adjusted, a warning of singularity may be generated.

A pulse signal warning a singularity may be generated.

The method may further include steps as follows.

Strength corresponding to a coefficient of X axis or Y-axis polarization of an order of a filter in the equalizer may be determined using two coefficients of X-axis or Y-axis polarization among the coefficients of the equalizer.

It may be determined, using the strength corresponding to a coefficient of X axis or Y-axis polarization of an order of the filter, that a central position of taps of coefficients of X axis or Y-axis polarization of the equalizer has deviated. The central position of taps of coefficients of X axis or Y-axis polarization of the equalizer may then be adjusted.

The central position of taps of coefficients of X axis polarization of the equalizer and the central position of taps of coefficients of Y-axis polarization of the equalizer may be adjusted respectively.

Strength corresponding to a coefficient of X axis polarization of an order of a filter in the equalizer may be determined using two coefficients of X axis polarization among the coefficients of the equalizer. It may be determined, using the strength corresponding to a coefficient of X axis polarization of an order of the filter, that a central position of taps of coefficients of the equalizer has deviated. The central position of taps of coefficients of the equalizer may then be adjusted.

Strength corresponding to a coefficient of Y axis polarization of an order of a filter in the equalizer may be determined using two coefficients of Y axis polarization among the coefficients of the equalizer. It may be determined, using the strength corresponding to a coefficient of Y axis polarization of an order of the filter, that a central position of taps of coefficients of the equalizer has deviated. The central position of taps of coefficients of the equalizer may then be adjusted.

It may be determined, using the strength corresponding to a coefficient of X axis or Y-axis polarization of an order of the filter, that the central position of taps of coefficients of X axis or Y-axis polarization of the equalizer has deviated, and the central position of taps of coefficients of X axis or Y-axis polarization of the equalizer may then be adjusted, as follows.

A third parameter may be set as a maximal strength found by searching strength corresponding to a first coefficient of X axis or Y-axis polarization of an order of the filter. A fourth parameter may be set as a first position index corresponding to the third parameter.

A fifth parameter may be set as a maximal strength found by searching strength corresponding to a second coefficient of X axis or Y-axis polarization of an order of the filter. A sixth parameter may be set as a second position index corresponding to the fifth parameter.

It may be determined, using the third parameter, the fourth parameter, the fifth parameter, the sixth parameter, and a preset condition, that the central position of taps of coefficients of X axis or Y-axis polarization of the equalizer has deviated. The central position of taps of coefficients of X axis or Y-axis polarization of the equalizer may then be moved to the left or to the right by M taps. The M may be an integer no less than 1.

Note that by first and second coefficients herein, it indicates but that the coefficients are different coefficients. There is no limitation to a form of a coefficient. Similarly, by first parameter, second parameter, . . . , it indicates but that the parameters are different parameters. There is no limitation to a form of a parameter.

In an actual application, a coefficient used in adjusting the central position of taps of coefficients of X axis as well as a parameter and a set threshold thereof may or may not be identical to that used in adjusting the central position of taps of coefficients of Y axis, depending on an actual condition.

It may be determined, using the third parameter, the fourth parameter, the fifth parameter, the sixth parameter, and the preset condition, that the central position of taps of coefficients of X axis or Y-axis polarization of the equalizer has deviated, and the central position of taps of coefficients of X axis or Y-axis polarization of the equalizer may then be moved to the left or to the right by M taps, as follows.

When both the fourth and sixth parameters are no greater than a third threshold and both the third and fifth parameters are greater than a fifth threshold, the central position of taps of coefficients of X axis or Y-axis polarization of the equalizer may be moved to the right by M taps.

Alternatively, when both the fourth and sixth parameters are no less than a fourth threshold and both the third and fifth parameters are greater than the fifth threshold, the central position of taps of coefficients of X axis or Y-axis polarization of the equalizer may be moved to the left by M taps.

The third threshold, the fourth threshold, the fifth threshold, and the sixth threshold may be set using a result of simulation.

The central position of taps of coefficients of X axis polarization may be adjusted with formulas as follows.

Strength corresponding to a first coefficient of X axis polarization of an order of a filter in the equalizer may be determined with a formula as follows.

$$h1(1,col)=(\text{real}(Hxx(1,col)))^2+(\text{imag}(Hxx(1,col)))^2 \quad (4)$$

Strength corresponding to a second coefficient of X axis polarization of an order of a filter in the equalizer may be determined with a formula as follows.

$$h2(1,col)=(\text{real}(Hxy(1,col)))^2+(\text{imag}(Hxy(1,col)))^2 \quad (5)$$

The third parameter may be expressed by a formula as follows.

$$m1=\text{max\_value}(h1(1,col)) \quad (6)$$

The fourth parameter may be expressed by a formula as follows.

$$w1=\text{max\_value\_index}(h1(1,col)) \quad (7)$$

The fifth parameter may be expressed by a formula as follows.

$$m2=\text{max\_value}(h2(1,col)) \quad (8)$$

The sixth parameter may be expressed by a formula as follows.

$$w2=\text{max\_value\_index}(h2(1,col)) \quad (9)$$

The third threshold may be denoted by A1. The fourth threshold may be denoted by A2. The fifth threshold may be denoted by G1. The sixth threshold may be denoted by G2. It may be determined whether the central position has deviated, and the central position may then be adjusted as follows.

When (w1>=A1&&w1<=A2)&&(w2>=A1&&w2<=A2), it means that the central position has not deviated and no adjustment is needed.

When (m1>G1&&w1<=A1)&&(m2>G1&&w2<=A1), it means that the central position has deviated and is to be moved to the right by M taps.

When (m1>G1&&w1>=A2)&&(m2>G1&&w2>=A2), it means that the central position has deviated and is to be moved to the left by M taps.

When none of the conditions is met, the central position may not be adjusted.

In an actual application, there is no fixed order between adjusting the central position of taps of coefficients of the equalizer and the singularity alteration/adjustment on the coefficients of the equalizer (steps 101 to 103). Singularity adjustment may be performed on the coefficients of the equalizer, followed by the process of adjusting the central position of taps of coefficients of the equalizer. In this case, as change in a channel is in general slow, the flow/process of adjusting the central position of taps of coefficients of the equalizer may be executed after the flow/process of singularity adjustment has completed for some time. Alternatively, the flow/process of adjusting the central position of taps of coefficients of the equalizer may be followed by the flow/process of singularity adjustment. In this case, as change in a channel is in general slow, singularity adjustment may be performed after the flow/process of adjusting the central position of taps of coefficients of the equalizer has completed for some time.

Note that in an actual application, as change in a channel is in general slow, the flow/process of adjusting the central position of taps of coefficients of the equalizer and that of singularity adjustment may be performed periodically, without impacting system performance. Power consumption by equipment may be reduced as well.

With the method according to an embodiment herein, a jones matrix is acquired with coefficients of an equalizer; a parameter of the jones matrix is acquired using the jones matrix; when it is determined, using the parameter of the jones matrix, that the coefficients are of singularity characteristics, a coefficient of X-axis or Y-axis polarization among the coefficients is adjusted. Only a coefficient of X-axis or Y-axis polarization is adjusted, such that both centers of the coefficients of X-axis and Y-axis polarizations may be adjusted to a central position of taps of coefficients. Thus, the coefficients of the equalizer may be adjusted accurately, thereby improving filter performance and system stability.

A first value may be acquired by summing over N acquired instances of the third parameter. The N may be an integer greater than 1. It may be determined whether the first value is less than a second threshold. When the first value is less than the second threshold, it may be determined that the coefficients are of singularity characteristics. There may be major fluctuation among individual instances of the third parameter. By summing over instances of the third parameter, it may be determined, with increased accuracy, whether the coefficients are of singularity characteristics.

Strength corresponding to a coefficient of X axis or Y-axis polarization of an order of a filter in the equalizer may be determined using two coefficients of X-axis or Y-axis polarization among the coefficients of the equalizer. It may be determined, using the strength corresponding to a coefficient of X axis or Y-axis polarization of an order of the filter, that a central position of taps of coefficients of X axis or Y-axis polarization of the equalizer has deviated. The central position of taps of coefficients of X axis or Y-axis polarization of the equalizer may then be adjusted. Singularity adjustment and center adjustment on the coefficients of the equalizer may further improve filter performance and system stability.

Figure 3:
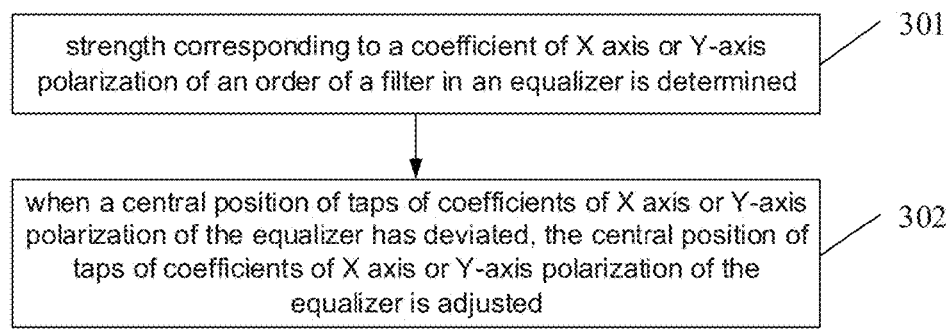
FIG. 3 is a flowchart of a method for adjusting a coefficient of an equalizer according to an embodiment herein.

As shown in FIG. 3, a method for adjusting a coefficient of an equalizer according to an embodiment herein includes steps as follows.

In step 301, strength corresponding to a coefficient of X axis or Y-axis polarization of an order of a filter in the equalizer is determined using two coefficients of X-axis or Y-axis polarization among coefficients of the equalizer.

In step 302, when it is determined, using the strength corresponding to a coefficient of X axis or Y-axis polarization of an order of the filter, that a central position of taps of coefficients of X axis or Y-axis polarization of the equalizer has deviated, the central position of taps of coefficients of X axis or Y-axis polarization of the equalizer is adjusted.

A third parameter may be set as a maximal strength found by searching strength corresponding to a first coefficient of X axis or Y-axis polarization of an order of the filter. A fourth parameter may be set as a first position index corresponding to the third parameter.

A fifth parameter may be set as a maximal strength found by searching strength corresponding to a second coefficient of X axis or Y-axis polarization of an order of the filter. A sixth parameter may be set as a second position index corresponding to the fifth parameter.

It may be determined, using the third parameter, the fourth parameter, the fifth parameter, the sixth parameter, and a preset condition, that the central position of taps of coefficients of X axis or Y-axis polarization of the equalizer has deviated. The central position of taps of coefficients of X axis or Y-axis polarization of the equalizer may then be moved to the left or to the right by M taps. The M may be an integer no less than 1.

Note that by first and second coefficients herein, it indicates but that the coefficients are different coefficients. There is no limitation to a form of a coefficient. Similarly, by first parameter, second parameter, . . . , it indicates but that the parameters are different parameters. There is no limitation to a form of a parameter.

In an actual application, a coefficient used in adjusting the central position of taps of coefficients of X axis as well as a parameter and a set threshold thereof may or may not be identical to that used in adjusting the central position of taps of coefficients of Y axis, depending on an actual condition.

It may be determined, using the third parameter, the fourth parameter, the fifth parameter, the sixth parameter, and the preset condition, that the central position of taps of coefficients of X axis or Y-axis polarization of the equalizer has deviated, and the central position of taps of coefficients of X axis or Y-axis polarization of the equalizer may then be moved to the left or to the right by M taps, as follows.

When both the fourth and sixth parameters are no greater than a third threshold and both the third and fifth parameters are greater than a fifth threshold, the central position of taps of coefficients of X axis or Y-axis polarization of the equalizer may be moved to the right by M taps.

Alternatively, when both the fourth and sixth parameters are no less than a fourth threshold and both the third and fifth parameters are greater than the fifth threshold, the central position of taps of coefficients of X axis or Y-axis polarization of the equalizer may be moved to the left by M taps.

The third threshold, the fourth threshold, the fifth threshold, and the sixth threshold may be set using a result of simulation.

The central position of taps of coefficients of X axis polarization of the equalizer and the central position of taps of coefficients of Y-axis polarization of the equalizer may be adjusted respectively.

Strength corresponding to a coefficient of X axis polarization of an order of a filter in the equalizer may be determined using two coefficients of X axis polarization among the coefficients of the equalizer. It may be determined, using the strength corresponding to a coefficient of X axis polarization of an order of the filter, that a central position of taps of coefficients of the equalizer has deviated. The central position of taps of coefficients of the equalizer may then be adjusted.

Strength corresponding to a coefficient of Y axis polarization of an order of a filter in the equalizer may be determined using two coefficients of Y axis polarization among the coefficients of the equalizer. It may be determined, using the strength corresponding to a coefficient of Y axis polarization of an order of the filter, that a central position of taps of coefficients of the equalizer has deviated. The central position of taps of coefficients of the equalizer may then be adjusted.

The central position of taps of coefficients of X axis polarization may be adjusted with formulas as follows.

Strength corresponding to a first coefficient of X axis polarization of an order of a filter in the equalizer may be determined with a formula as follows.

$$h1(1,col)=(\text{real}(Hxx(1,col)))^2+(\text{imag}(Hxx(1,col)))^2 \qquad (4)$$

Strength corresponding to a second coefficient of X axis polarization of an order of a filter in the equalizer may be determined with a formula as follows.

$$h2(1,col)=(\text{real}(Hxy(1,col)))^2+(\text{imag}(Hxy(1,col)))^2 \qquad (5)$$

The third parameter may be expressed by a formula as follows.

$$m1=\text{max\_value}(h1(1,col)) \qquad (6)$$

The fourth parameter may be expressed by a formula as follows.

$$w1=\text{max\_value\_index}(h1(1,col)) \qquad (7)$$

The fifth parameter may be expressed by a formula as follows.

$$m2=\text{max\_value}(h2(1,col)) \qquad (8)$$

The sixth parameter may be expressed by a formula as follows.

$$w2=\text{max\_value\_index}(h2(1,col)) \qquad (9)$$

The third threshold may be denoted by A1. The fourth threshold may be denoted by A2. The fifth threshold may be denoted by G1. The sixth threshold may be denoted by G2. It may be determined whether the central position has deviated, and the central position may then be adjusted as follows.

When (w1>=A1&&w1<=A2)&&(w2>=A1&&w2<=A2), it means that the central position has not deviated and no adjustment is needed.

When (m1>G1&&w1<=A1)&&(m2>G1&&w2<=A1), it means that the central position has deviated and is to be moved to the right by M taps.

When (m1>G1&&w1>=A2)&&(m2>G1&&w2>=A2), it means that the central position has deviated and is to be moved to the left by M taps.

When none of the conditions is met, the central position may not be adjusted.

Note that in an actual application, as change in a channel is in general slow, the flow/process of adjusting the central position of taps of coefficients of the equalizer may be performed periodically, without impacting system performance. Power consumption by equipment may be reduced as well.

With the method according to an embodiment herein, strength corresponding to a coefficient of X axis or Y-axis polarization of an order of a filter in the equalizer is determined using two coefficients of X-axis or Y-axis polarization among coefficients of the equalizer; and when it is determined, using the strength corresponding to a coefficient of X axis or Y-axis polarization of an order of the filter, that a central position of taps of coefficients of X axis or Y-axis polarization of the equalizer has deviated, the central position of taps of coefficients of X axis or Y-axis polarization of the equalizer is adjusted. Only a coefficient of X-axis or Y-axis polarization is adjusted, such that both centers of the coefficients of X-axis and Y-axis polarizations may be adjusted to a central position of taps of coefficients. Thus, the coefficients of the equalizer may be adjusted accurately, thereby improving filter performance and system stability.

In an embodiment herein based on the above embodiments, the process of adjusting coefficients of an equalizer may be explained with a 100G DSP chip in a communication system in 100G optical transmission in a bearer network as an example.

A DSP chip and a multiplexer (MUX) chip in a 100G optical module are key to 100G long-distance transmission. Limited by a technical threshold and a high capital input, not many manufacturers are cable of developing a DSP chip. One may have to develop a DSP chip by oneself. A competitor who has developed a DSP chip successfully may put major stress on products of a 100G system by other manufacturers in terms of cost. The solution used by the competitor to develop the DSP chip may take away a substantial market share from an independent design company. Impact on market expectation may immediately lead to increasingly cautious investment on a DSP chip project by other manufacturers.

Therefore, there is a pressing need for autonomous development of a 100G DSP chip in order to support a plan of products for 100G long-distance transmission of a company to improve competitiveness of a brand of 100G products per se to avoid a lag-behind in market competition.

Figure 4:
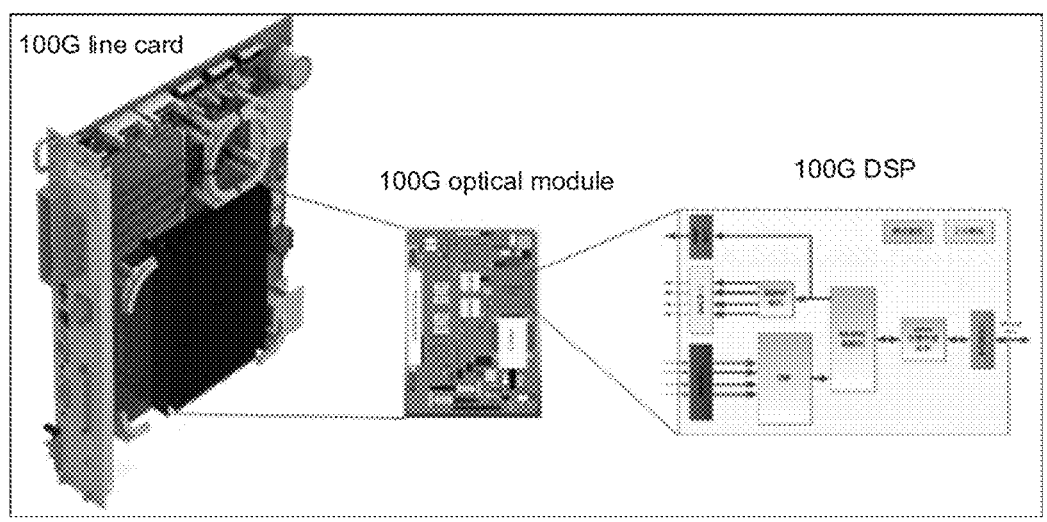
FIG. 4 is a diagram of a scene of applying a 100G Digital Signal Processor (DSP) chip according to an embodiment herein.

As shown in FIG. 4, a 100G DSP chip may apply in a 100G optical module in a 100G line card, mainly for processing a data signal, forming a vital part of the 100G optical module. Adaptive equalization may include Polarization Mode Dispersion (PMD), Chromatic Dispersion (CD), polarization mode demultiplexing, etc. Adaptive equalization may be a vital link in processing a data signal by a 100G DSP chip.

With a 100G DSP chip, adaptive equalization may be implemented using blind equalization by a Constant Modulus Algorithm (CMA). The blind equalization by the CMA makes up for damage to a signal caused by an imperfect channel. Interaction between light components of different polarizations may be compensated using a filter of a butterfly-shaped structure. As shown in FIG. 2, a filter of a butterfly-shaped structure may consist of four FIR filters. X and Y may be two polarized signals, respectively. Modulation by polarization multiplexing may be used in a communication system. A polarized signal may deviate during transmission, causing interference to another polarized signal. To cancel such interference, a filter of a butterfly-shaped structure is to be used to implement polarization demultiplexing. A coefficient used by an equalizer is as follows.

$$H(n) = H(n-1) + \sum_{0}^{31} \mu(R - |X_{out}(n-k)|^2)X_{out}(n-k)X_{in}^*(n-k)$$

The H (n−1) may be a coefficient for a last beat. The $X_{out}$ may be output filtered data. The $X^+_{in}$ may be an input vector of a filter involved in computing the $X_{out}$. The k may depend on a hardware delay. The R may be a configurable CMA output power factor. The μ may be a factor for stepwise time variation.

Figure 5:
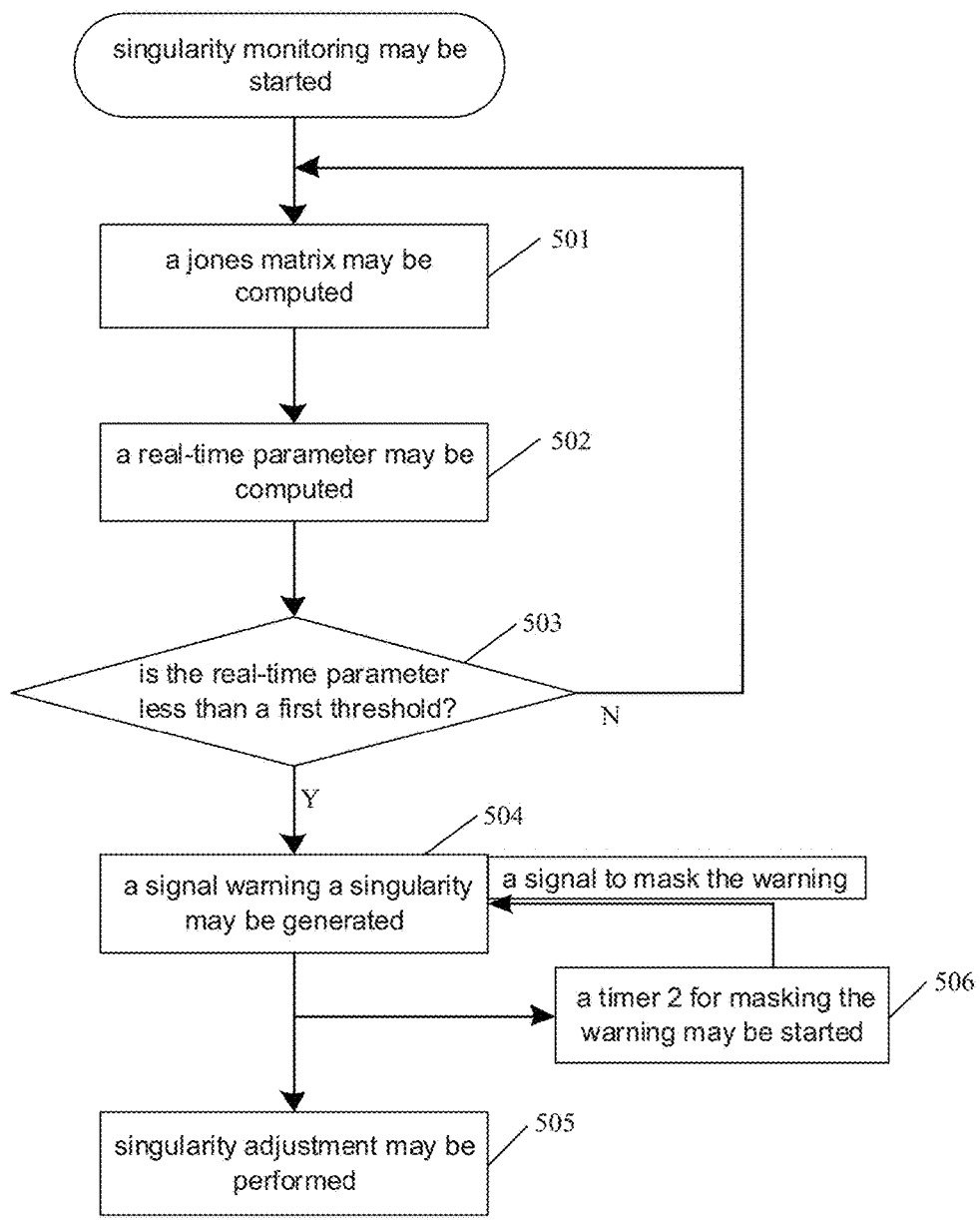
FIG. 5 is a flowchart of a method for adjusting a coefficient of an equalizer including singularity adjustment according to an embodiment herein.

Adjustment of a coefficient of an equalizer according to an embodiment herein may include singularity adjustment and center adjustment. In singularity adjustment, singularity in coefficients of an equalizer may be detected using a jones matrix of the coefficients of the equalizer. As shown in FIG. 5, singularity adjustment may include steps as follows.

In step 501, a jones matrix may be computed with coefficients of an equalizer.

The jones matrix may be $$\begin{bmatrix} h_{xx}(f) & h_{xy}(f) \\ h_{yx}(f) & h_{yy}(f) \end{bmatrix}.$$

In step 502, three parameters of the jones matrix may be computed.

$$\text{jones\_x} = |\text{jones }(1, 1)|^2 + |\text{jones }(1, 2)|^2 \quad (1)$$

$$\text{jones\_x} = |\text{jones }(2, 1)|^2 + |\text{jones }(2, 2)|^2 \quad (2)$$

$$\text{jones }(1, 1) = \sum_{col=1}^{n} Hxx(1, col).$$

$$\text{jones }(1, 2) = \sum_{col=1}^{n} Hxy(1, col).$$

$$\text{jones }(2, 1) = \sum_{col=1}^{n} Hyx(1, col).$$

$$\text{jones }(2, 2) = \sum_{col=1}^{n} Hyy(1, col).$$

The n may represent an order of a filter in the equalizer. The col may take on a value of 1, 2, . . . , or n.

The parameters of the jones matrix may be referred to as real-time parameters.

In step 503, it may be determined whether jones_val is less than a first threshold. When jones_val is less than the first threshold, step 504 may be executed. Otherwise, step 501 may be executed.

The first threshold may be set using a result of simulation.

When jones_val is less than the first threshold, it means that the coefficients of the equalizer are of singularity characteristics and need to be adjusted.

When jones_val is greater than the first threshold, it means that the coefficients of the equalizer show no singularity characteristics and do not need to be adjusted. In this case, no signal warning a singularity may be generated.

In step 504, a signal warning a singularity may be generated, and then steps 505 and 506 may be executed.

The generated signal warning a singularity may be a pulse signal.

In step 505, singularity adjustment may be performed on the coefficients of the equalizer.

When both the signal of X-axis polarization and the signal of Y-axis polarization converge or neither of the signal of X-axis polarization and the signal of Y-axis polarization converges, jones_x may be compared to jones_y. Singularity alteration may be performed on the coefficient of a polarization with a larger jones value. The coefficient having gone through the singularity alteration may then be set as the coefficient of a polarization with a smaller jones value. For example, when jones_x is less/smaller than jones_y, singularity alteration may have to be performed on the coefficient of X-axis polarization. That is, the coefficient of Y-axis polarization having gone through the singularity alteration may have to be set as the coefficient of X-axis polarization. Likewise, when jones_x is greater than jones_y, singularity alteration may have to be performed on the coefficient of Y-axis polarization. That is, the coefficient of X-axis polarization having gone through the singularity alteration may have to be set as the coefficient of Y-axis polarization.

Singularity adjustment may be performed on the coefficient of X-axis polarization as follows.

$$Hxx(1,col)=\text{conj}(Hyy(1,n+1-col)).$$

$$Hxy(1,col)=-\text{conj}(Hyx(1,n+1-col)).$$

Singularity adjustment may be performed on the coefficient of Y-axis polarization as follows.

$$Hyy(1,col)=\text{conj}(Hxx(1,n+1-col)).$$

$$Hyx(1,col)=-\text{conj}(Hxy(1,n+1-col)).$$

The conj may represent conjugation. The n may represent an order of a filter in the equalizer. The col may take on a value of 1, 2, . . . , or n.

There may be no limitation in how to determine whether the signal of X-axis or Y-axis polarization converges.

In step 506, a timer 2 for masking the warning may be started.

The timer 2 for masking the warning may serve to generate a signal to mask the warning to allow periodical singularity adjustment on the coefficients of the equalizer.

In an actual application, it may be determined whether the coefficients of the equalizer are of singularity characteristics using a sum over Jones_val as accumulated in time.

Figure 6:
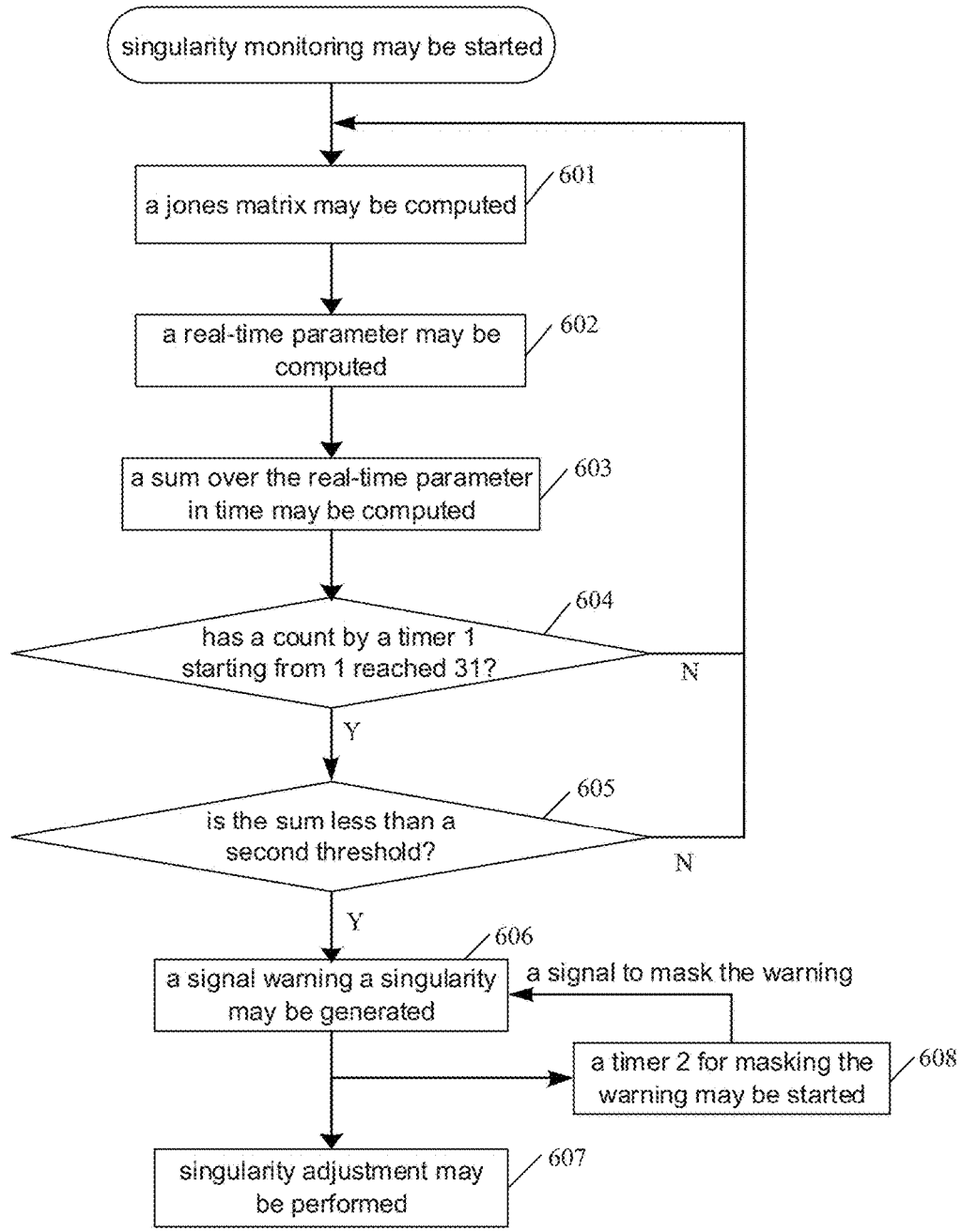
FIG. 6 is a flowchart of a method for adjusting a coefficient of an equalizer including singularity adjustment according to an embodiment herein.

In this case, as shown in FIG. 6, singularity adjustment may include steps as follows.

In step 601, a jones matrix may be computed with coefficients of an equalizer.

The jones matrix may be $$\begin{bmatrix} h_{xx}(f) & h_{xy}(f) \\ h_{yx}(f) & h_{yy}(f) \end{bmatrix}.$$

In step 602, three parameters of the jones matrix may be computed.

$$\text{jones\_x} = |\text{jones }(1, 1)|^2 + |\text{jones }(1, 2)|^2 \quad (1)$$

$$\text{jones\_y} = |\text{jones }(2, 1)|^2 + |\text{jones }(2, 2)|^2 \quad (2)$$

$$\text{jones\_val} = |\text{jones }(1, 1) * \text{jones }(2, 2) - \text{jones }(1, 2) * \text{jones }(2, 1)|^2 \quad (3)$$

$$\text{jones }(1, 1) = \sum_{col=1}^{n} Hxx(1, col).$$

$$\text{jones }(1, 2) = \sum_{col=1}^{n} Hxy(1, col).$$

$$\text{jones }(2, 1) = \sum_{col=1}^{n} Hyx(1, col).$$

$$\text{jones }(2, 2) = \sum_{col=1}^{n} Hyy(1, col).$$

The n may represent an order of a filter in the equalizer. The col may take on a value of 1, 2, . . . , or n.

The parameters of the jones matrix may be referred to as real-time parameters.

In step 603, a sum over jones_val in time may be computed.

The N may be 32.

In step 604, it may be determined whether a count by a timer 1 starting from 1 has reached 31. When it has, step 605 may be executed. Otherwise, step 601 may be executed.

In step 605, it may be determined whether the sum over jones_val in time is less than a second threshold. When it is, step 606 may be executed. Otherwise, step 601 may be executed.

The second threshold may be set using a result of simulation.

When the sum over jones_val in time is less than the second threshold, it means that the coefficients of the equalizer are of singularity characteristics and are to be adjusted.

When the sum over jones_val in time is greater than the second threshold, it means that the coefficients of the equalizer show no singularity characteristics and do not need to be adjusted. In this case, no signal warning a singularity may be generated.

In step 606, a signal warning a singularity may be generated. Then steps 607 and 608 may be executed.

The generated signal warning a singularity may be a pulse signal.

In step 607, singularity adjustment may be performed on the coefficients of the equalizer.

When both the signal of X-axis polarization and the signal of Y-axis polarization converge or neither of the signal of X-axis polarization and the signal of Y-axis polarization converges, jones_x may be compared to jones_y. Singularity alteration may be performed on the coefficient of a polarization with a larger jones value. The coefficient having gone through the singularity alteration may then be set as the coefficient of a polarization with a smaller jones value. For example, when jones_x is less/smaller than jones_y, singularity alteration may have to be performed on the coefficient of X-axis polarization. That is, the coefficient of Y-axis polarization having gone through the singularity alteration may have to be set as the coefficient of X-axis polarization. Likewise, when jones_x is greater than jones_y, singularity alteration may have to be performed on the coefficient of Y-axis polarization. That is, the coefficient of X-axis polarization having gone through the singularity alteration may have to be set as the coefficient of Y-axis polarization.

Singularity adjustment may be performed on the coefficient of X-axis polarization as follows.

$$Hxx(1,col)=\text{conj}(Hyy(1,n+1-col)).$$

$$Hxy(1,col)=-\text{conj}(Hyx(1,n+1-col)).$$

Singularity adjustment may be performed on the coefficient of Y-axis polarization as follows.

$$Hyy(1,col)=\text{conj}(Hxx(1,n+1-col)).$$

$$Hyx(1,col)=-\text{conj}(Hxy(1,n+1-col)).$$

The conj may represent conjugation. The n may represent an order of a filter in the equalizer. The col may take on a value of 1, 2, . . . , or n.

There may be no limitation in how to determine whether the signal of X-axis or Y-axis polarization converges.

In step 608, a timer 2 for masking the warning may be started.

The timer 2 for masking the warning may serve to generate a signal to mask the warning to allow periodical singularity adjustment on the coefficients of the equalizer.

There may be major fluctuation among individual instances of jones_val. By summing over instances of jones_val, it may be determined, with increased accuracy, whether the coefficients are of singularity characteristics.

Figure 7:
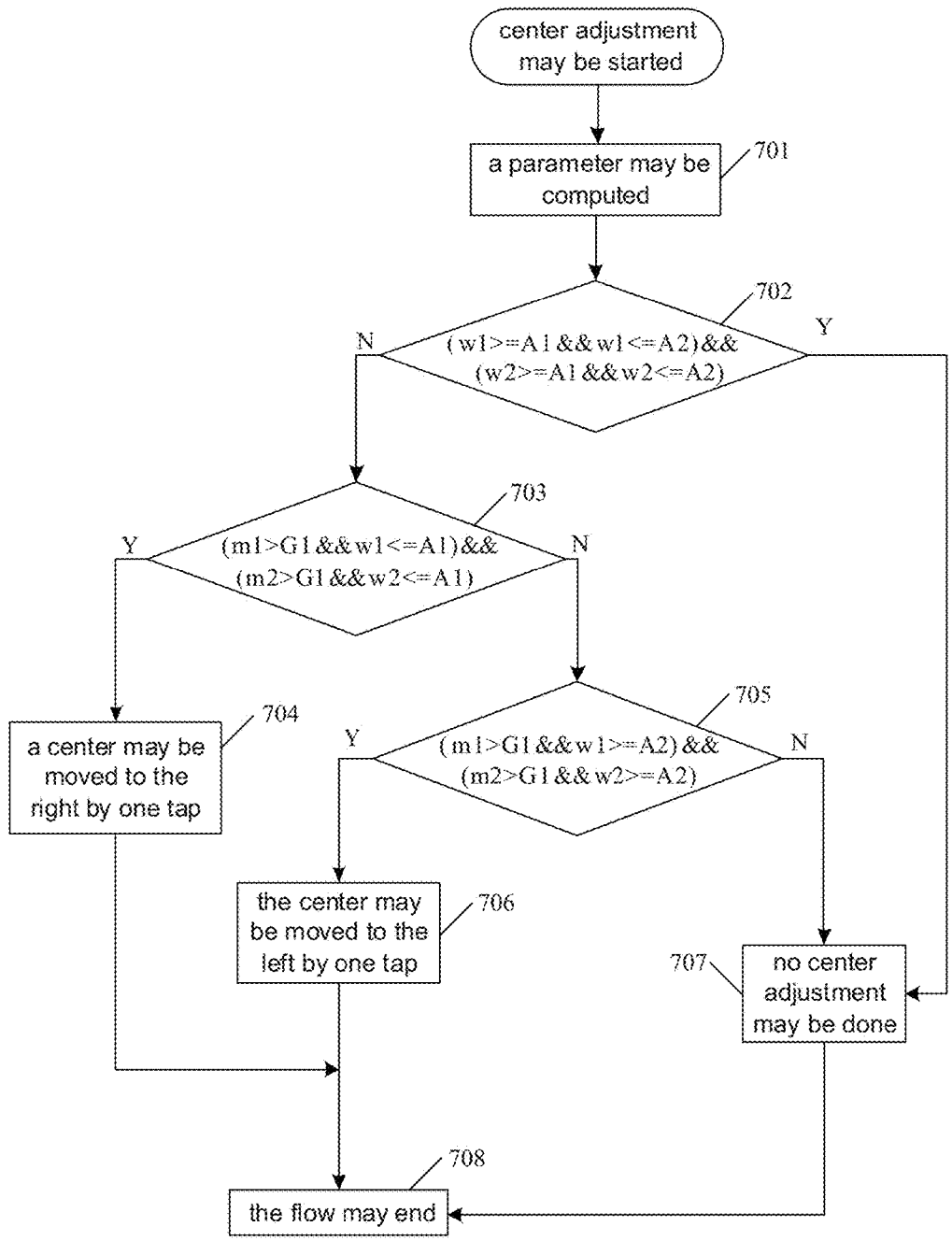
FIG. 7 is a flowchart of a method for adjusting a center of coefficients of an equalizer according to an embodiment herein.

As shown in FIG. 7, taking center adjustment on coefficients of X axis polarization as an example, center adjustment on coefficients of an equalizer according to an embodiment herein may include steps as follow.

In step 701, a third parameter, a fourth parameter, a fifth parameter, and a sixth parameter may be computed.

Strength corresponding to a first coefficient of X axis polarization of an order of a filter in the equalizer may be determined with a formula as follows.

$$h1(1,col)=(\text{real}(Hxx(1,col)))^2+(\text{imag}(Hxx(1,col)))^2 \qquad (4)$$

Strength corresponding to a second coefficient of X axis polarization of an order of a filter in the equalizer may be determined with a formula as follows.

$$h2(1,col)=(\text{real}(Hxy(1,col)))^2+(\text{imag}(Hxy(1,col)))^2 \qquad (5)$$

The third parameter may be expressed by a formula as follows.

$$m1=\text{max\_value}(h1(1,col)) \qquad (6)$$

The fourth parameter may be expressed by a formula as follows.

$$w1=\text{max\_value\_index}(h1(1,col)) \qquad (7)$$

The fifth parameter may be expressed by a formula as follows.

$$m2=\text{max\_value}(h2(1,col)) \qquad (8)$$

The sixth parameter may be expressed by a formula as follows.

$$w2=\text{max\_value\_index}(h2(1,col)) \qquad (9)$$

The m1 may be a maximal value among h1(1, col). The w1 may be a position index corresponding to the maximal value among h1(1, col). The m2 may be a maximal value among h2(1, col). The w2 may be a position index corresponding to the maximal value among h2(1, col).

After the parameters have been acquired, it may be determined, according to the parameters and a condition, that a central position is to be moved to the left/right by one tap, or is to be kept unmoved. That is, steps 702 to 708 may be executed.

In step 702, it may be determined whether (w1>=A1&&w1<=A2)&& (w2>=A1&&w2<=A2) is true. If it is true, step 707 may be executed. Otherwise, step 703 may be executed.

When (w1>=A1&&w1<=A2)&& (w2>=A1&&w2<=A2) is met, it means that the central position has not deviated and thus does not need to be moved.

In step 703, it may be determined whether (m1>G1&&w1<=A1)&&(m2>G1&&w2<=A1) is true. When it is, step 704 may be executed. Otherwise, step 705 may be executed.

When (m1>G1&&w1<=A1)&&(m2>G1&&w2<=A1), it means that the central position has deviated and thereby is to be moved.

In step 704, the central position may be moved to the right by one tap, and then step 708 may be executed.

In step 705, it may be determined whether (m1>G1&&w1>=A2)&&(m2>G1&&w2>=A2) is met. When it is, step 706 may be executed. Otherwise, step 707 may be executed.

When (m1>G1&&w1>=A2)&&(m2>G1&&w2>=A2) is met, it means that the central position has deviated and thereby is to be moved.

In step 706, the central position may be moved to the left by one tap, and then step 708 may be executed.

In step 707, step 708 may be executed, skipping adjustment to the central position.

In step 708, the flow may end.

Figure 8:
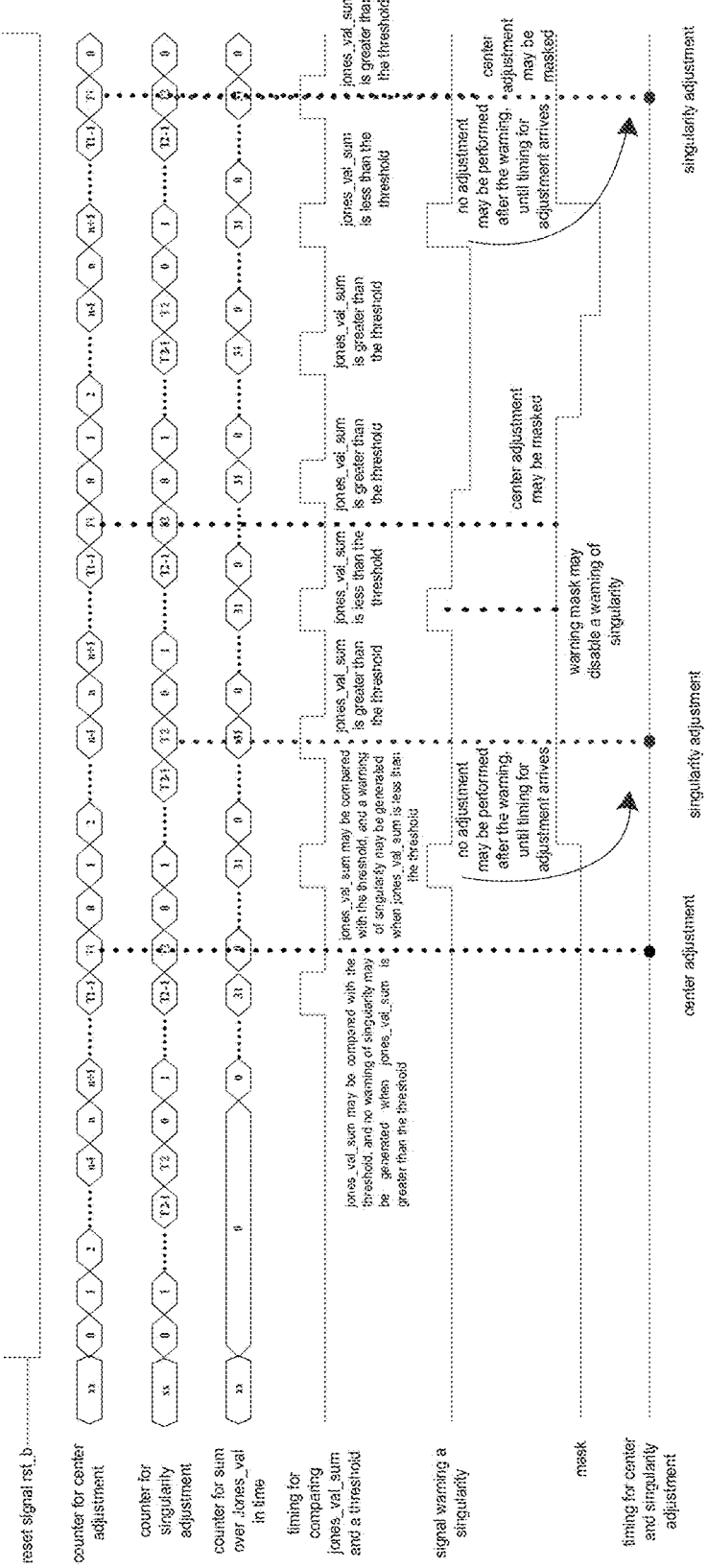
FIG. 8 is a diagram of timing of center adjustment and singularity adjustment according to an embodiment herein.

In an actual application, to reduce power consumption, both singularity adjustment and center adjustment may be performed periodically. No adjustment may be performed at any other time. As change in a channel is in general slow, periodical adjustment will have no impact on system performance. Neither center adjustment nor further singularity adjustment may be conducted within a period of time after singularity adjustment has been done. In an actual application, timing and mask of singularity adjustment and center adjustment may be selected with reference to FIG. 8. By monitoring, and performing singularity adjustment and center adjustment on, coefficients of an equalizer, filter performance and system stability may be improved.

It may be seen that with blind equalization by the CMA, coefficients of an equalizer may be updated adaptively with a dynamic step size. The coefficients of the equalizer may be monitored in real time. When singularity characteristics of the coefficients are found, singularity adjustment may be performed. When a center of the coefficients is at a boundary of taps, center adjustment may be performed. Compared with existing mainstream equalization in the industry, with a solution according to an embodiment herein, a central position of coefficients of an equalizer is adjustable, of good real-time performance, and converges fast. Hardware implementation thereof is simple. Thus, performance of a 100G DSP chip in terms of equalization is improved, thereby improving overall performance of a 100G DSP processing chip, reducing an overall cost.

Figure 9:
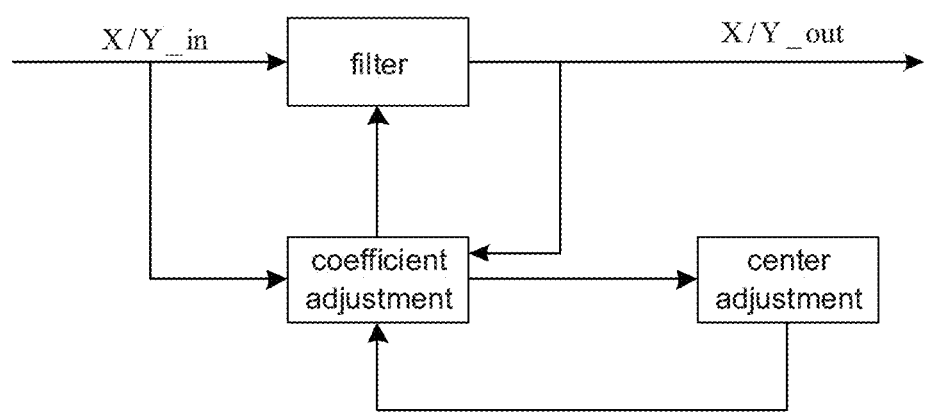
FIG. 9 is a diagram of blind equalization by a Constant Modulus Algorithm (CMA) according to an embodiment herein.

As shown in FIG. 9, blind equalization by the CMA may include filter, coefficient adjustment, and center adjustment. Input data may be filtered using adjusted and updated coefficients.

Figure 10:
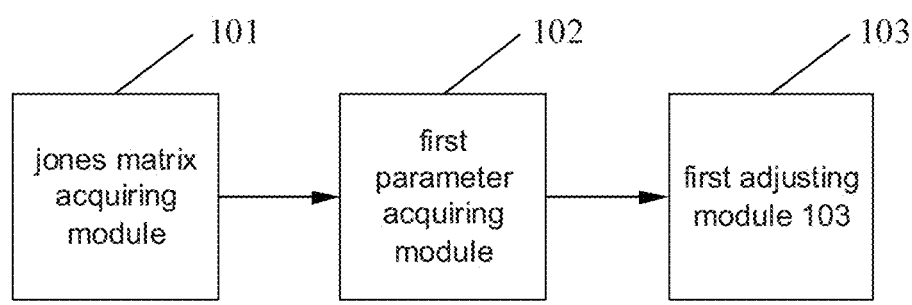
FIG. 10 is a diagram of a structure of a device for adjusting a coefficient of an equalizer according to an embodiment herein.

As shown in FIG. 10, to implement the method according to an embodiment herein, a device for adjusting a coefficient of an equalizer according to an embodiment herein includes a jones matrix acquiring module 101, a first parameter acquiring module 102, and a first adjusting module 103.

The jones matrix acquiring module 101 is arranged for: acquiring a jones matrix with coefficients of an equalizer.

The first parameter acquiring module 102 is arranged for acquiring a parameter of the jones matrix.

The first adjusting module 103 is arranged for: in response to determining, using the parameter of the jones matrix, that the coefficients are of singularity characteristics, adjusting a coefficient of X-axis or Y-axis polarization among the coefficients.

In an actual application, as shown in FIG. 2, X and Y may be two polarized signals, respectively. Modulation by polarization multiplexing may be used in a communication system. A polarized signal may deviate during transmission, causing interference to another polarized signal. To cancel such interference, a filter of a butterfly-shaped structure is to be used to implement polarization demultiplexing. The butterfly filter may be implemented by four Finite Impulse Response (FIR) filters. The coefficients of the equalizer may include Hxx (f), Hxy (f), Hyy (f), and Hyx (f). The jones matrix may be $$\begin{bmatrix} h_{xx}(f) & h_{xy}(f) \\ h_{yx}(f) & h_{yy}(f) \end{bmatrix}.$$

The first parameter acquiring module 102 may be arranged for: acquiring, by performing a mathematical operation on the jones matrix, a first parameter, a second parameter, and a third parameter. The first parameter may represent strength of a signal of X-axis polarization. The second parameter may represent strength of a signal of Y-axis polarization. The third parameter may represent an angle between the signal of X-axis polarization and the signal of Y-axis polarization.

With the jones matrix, the first parameter may be expressed by a formula as follows.

$$\text{jones\_}x = |\text{jones}(1,1)|^2 + |\text{jones}(1,2)|^2 \quad (1)$$

The second parameter may be expressed by a formula as follows.

$$\text{jones\_}y = |\text{jones}(2,1)|^2 + |\text{jones}(2,2)|^2 \quad (2)$$

The third parameter may be expressed by a formula as follows.

$$\text{jones\_val} = |\text{jones}(1,1) * \text{jones}(2,2) - \text{jones}(1,2) * \text{jones}(2,1)|^2 \quad (3)$$

$$\text{jones}(1,1) = \sum_{col=1}^{n} Hxx(1, col).$$

$$\text{jones}(1,2) = \sum_{col=1}^{n} Hxy(1, col).$$

$$\text{jones}(2,1) = \sum_{col=1}^{n} Hyx(1, col).$$

$$\text{jones}(2,2) = \sum_{col=1}^{n} Hyy(1, col).$$

The n may represent an order of a filter in the equalizer. The col may take on a value of 1, 2, . . . , or n.

When the coefficients are of singularity characteristics, a signal of X-axis polarization and a signal of Y-axis polarization may converge to each other in terms of polarization.

It may be determined as follows using the parameter of the jones matrix, that the coefficients are of singularity characteristics.

The first adjusting module 103 may be arranged for determining whether the third parameter is less than a first threshold; in response to determining that the third parameter is less than the first threshold, determining that the coefficients are of singularity characteristics.

The first threshold may be set using a result of simulation.

It may be determined as follows using the parameter of the jones matrix, that the coefficients are of singularity characteristics.

The first adjusting module 103 may be arranged for: acquiring a first value by summing over N instances of the third parameter, the N being an integer greater than 1; determining whether the first value is less than a second threshold; in response to determining that the first value is less than the second threshold, determining that the coefficients are of singularity characteristics.

There may be major fluctuation among individual instances of the third parameter. By summing over instances of the third parameter, it may be determined, with increased accuracy, whether the coefficients are of singularity characteristics.

The second threshold may be set using a result of simulation.

With the jones matrix, the first value may be expressed by a formula as follows.

$$\text{jones\_val\_sum} = \sum_{cnt=1}^{N} \text{jones\_val}_{cnt} \qquad (4)$$

A coefficient of X-axis or Y-axis polarization among the coefficients may be adjusted as follows.

The first adjusting module 103 may be arranged for in response to determining that the first parameter is greater than the second parameter, performing singularity alteration on the coefficient of X-axis polarization; setting the coefficient of X-axis polarization having gone through the singularity alteration as the coefficient of Y-axis polarization.

Alternatively, the first adjusting module 103 may be arranged for: in response to determining that the first parameter is less than the second parameter, performing singularity alteration on the coefficient of Y-axis polarization; setting the coefficient of Y-axis polarization having gone through the singularity alteration as the coefficient of X-axis polarization.

Singularity alteration may be performed on the coefficient of X-axis polarization, and the coefficient of X-axis polarization having gone through the singularity alteration may be set as the coefficient of Y-axis polarization as follows.

$Hyy(1,col) = \text{conj}(Hxx(1,n+1-col))$.

$Hyx(1,col) = -\text{conj}(Hxy(1,n+1-col))$.

The conj may represent conjugation. The n may represent an order of a filter in the equalizer. The col may take on a value of 1, 2, . . . , or n.

Singularity alteration may be performed on the coefficient of Y-axis polarization, and the coefficient of Y-axis polarization having gone through the singularity alteration may be set as the coefficient of X-axis polarization as follows.

$Hxx(1,col) = \text{conj}(Hyy(1,n+1-col))$.

$Hxy(1,col) = -\text{conj}(Hyx(1,n+1-col))$.

The conj may represent conjugation. The n may represent an order of a filter in the equalizer. The col may take on a value of 1, 2, . . . , or n.

The device may further include a first warning module. The first warning module may be arranged for: in response to determining that the coefficients are of singularity characteristics, before the coefficient of X-axis or Y-axis polarization among the coefficients is adjusted, generating a warning of singularity.

The first warning module may generate a pulse signal warning a singularity.

The device may further include a first strength determining module and a second adjusting module.

The first strength determining module may be arranged for determining, using two coefficients of X-axis or Y-axis polarization among the coefficients of the equalizer, strength corresponding to a coefficient of X axis or Y-axis polarization of an order of a filter in the equalizer.

The second adjusting module may be arranged for: in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

The central position of taps of coefficients of X axis polarization of the equalizer and the central position of taps of coefficients of Y-axis polarization of the equalizer may be adjusted respectively.

The first strength determining module may be arranged for: determining, using two coefficients of X axis polarization among the coefficients of the equalizer, strength corresponding to a coefficient of X axis polarization of an order of a filter in the equalizer.

The second adjusting module may be arranged for: in response to determining, using the strength corresponding to a coefficient of X axis polarization of an order of the filter, that a central position of taps of coefficients of the equalizer has deviated, adjusting the central position of taps of coefficients of the equalizer.

The first strength determining module may be arranged for: determining, using two coefficients of Y axis polarization among the coefficients of the equalizer, strength corresponding to a coefficient of Y axis polarization of an order of a filter in the equalizer. The second adjusting module may be arranged for: in response to determining, using the strength corresponding to a coefficient of Y axis polarization of an order of the filter, that a central position of taps of coefficients of the equalizer has deviated, adjusting the central position of taps of coefficients of the equalizer.

It may be determined, using the strength corresponding to a coefficient of X axis or Y-axis polarization of an order of the filter, that the central position of taps of coefficients of X axis or Y-axis polarization of the equalizer has deviated, and the central position of taps of coefficients of X axis or Y-axis polarization of the equalizer may then be adjusted, as follows.

The second adjusting module may be arranged for: setting a third parameter as a maximal strength found by searching strength corresponding to a first coefficient of X axis or Y-axis polarization of an order of the filter, and setting a fourth parameter as a first position index corresponding to the third parameter.

The second adjusting module may be arranged for: setting a fifth parameter as a maximal strength found by searching strength corresponding to a second coefficient of X axis or Y-axis polarization of an order of the filter, and setting a sixth parameter as a second position index corresponding to the fifth parameter.

The second adjusting module may be arranged for: in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps. The M may be an integer no less than 1.

Note that by first and second coefficients herein, it indicates but that the coefficients are different coefficients. There is no limitation to a form of a coefficient. Similarly, by first parameter, second parameter, . . . , it indicates but that the parameters are different parameters. There is no limitation to a form of a parameter.

In an actual application, a coefficient used in adjusting the central position of taps of coefficients of X axis as well as a parameter and a set threshold thereof may or may not be identical to that used in adjusting the central position of taps of coefficients of Y axis, depending on an actual condition.

It may be determined, using the third parameter, the fourth parameter, the fifth parameter, the sixth parameter, and the preset condition, that the central position of taps of coefficients of X axis or Y-axis polarization of the equalizer has deviated, and the central position of taps of coefficients of X axis or Y-axis polarization of the equalizer may then be moved to the left or to the right by M taps, as follows.

The second adjusting module may be arranged for: in response to determining that both the fourth and sixth parameters are no greater than a third threshold and both the third and fifth parameters are greater than a fifth threshold, moving the central position of taps of coefficients of X axis or Y-axis polarization of the equalizer to the right by M taps.

Alternatively, the second adjusting module may be arranged for: in response to determining that both the fourth and sixth parameters are no less than a fourth threshold and both the third and fifth parameters are greater than the fifth threshold, moving the central position of taps of coefficients of X axis or Y-axis polarization of the equalizer to the left by M taps.

The third threshold, the fourth threshold, the fifth threshold, and the sixth threshold may be set using a result of simulation.

The central position of taps of coefficients of X axis polarization may be adjusted with formulas as follows.

Strength corresponding to a first coefficient of X axis polarization of an order of a filter in the equalizer may be determined with a formula as follows.

$$h1(1,col)=(\text{real}(Hxx(1,col)))^2+(\text{imag}(Hxx(1,col)))^2 \quad (4)$$

Strength corresponding to a second coefficient of X axis polarization of an order of a filter in the equalizer may be determined with a formula as follows.

$$h2(1,col)=(\text{real}(Hxy(1,col)))^2+(\text{imag}(Hxy(1,col)))^2 \quad (5)$$

The third parameter may be expressed by a formula as follows.

$$m1=\text{max\_value}(h1(1,col)) \quad (6)$$

The fourth parameter may be expressed by a formula as follows.

$$w1=\text{max\_value\_index}(h1(1,col)) \quad (7)$$

The fifth parameter may be expressed by a formula as follows.

$$m2=\text{max\_value}(h2(1,col)) \quad (8)$$

The sixth parameter may be expressed by a formula as follows.

$$w2=\text{max\_value\_index}(h2(1,col)) \quad (9)$$

The third threshold may be denoted by A1. The fourth threshold may be denoted by A2. The fifth threshold may be denoted by G1. The sixth threshold may be denoted by G2. It may be determined whether the central position has deviated, and the central position may then be adjusted as follows.

When $(w1>=A1\&\&w1<=A2)\&\&(w2>=A1\&\&w2<=A2)$, it means that the central position has not deviated and no adjustment is needed.

When $(m1>G1\&\&w1<=A1)\&\&(m2>G1\&\&w2<=A1)$, it means that the central position has deviated and is to be moved to the right by M taps by the second adjusting module.

When $(m1>G1\&\&w1>=A2)\&\&(m2>G1\&\&w2>=A2)$, it means that the central position has deviated and is to be moved to the left by M taps by the second adjusting module.

When none of the conditions is met, the central position may not be adjusted by the second adjusting module.

In an actual application, there is no fixed order between adjusting the central position of taps of coefficients of the equalizer and the singularity alteration/adjustment on the coefficients of the equalizer. Singularity adjustment may be performed on the coefficients of the equalizer, followed by the process of adjusting the central position of taps of coefficients of the equalizer. In this case, as change in a channel is in general slow, the flow/process of adjusting the central position of taps of coefficients of the equalizer may be executed after the flow/process of singularity adjustment has completed for some time. Alternatively, the flow/process of adjusting the central position of taps of coefficients of the equalizer may be followed by the flow/process of singularity adjustment. In this case, as change in a channel is in general slow, singularity adjustment may be performed after the flow/process of adjusting the central position of taps of coefficients of the equalizer has completed for some time.

Note that in an actual application, as change in a channel is in general slow, the flow/process of adjusting the central position of taps of coefficients of the equalizer and that of singularity adjustment may be performed periodically, without impacting system performance. Power consumption by equipment may be reduced as well.

In an actual application, the jones matrix acquiring module 101, the first parameter acquiring module 102, the first adjusting module 103, the first strength determining module, and the second adjusting module may be implemented by a Central Processing Unit (CPU), a Micro Control Unit (MCU), a DSP, or a Field-Programmable Gate Array (FPGA) in the device for adjusting a coefficient of an equalizer. The first warning module may be implemented by an alarm in the device for adjusting a coefficient of an equalizer.

With the device for adjusting a coefficient of an equalizer according to an embodiment herein, a jones matrix acquiring module 101 acquires a jones matrix with coefficients of an equalizer; a first parameter acquiring module 102 acquires a parameter of the jones matrix using the jones matrix; a first adjusting module 103 determines, using the parameter of the jones matrix, that the coefficients are of singularity characteristics, and then adjusts a coefficient of X-axis or Y-axis polarization among the coefficients. Only a coefficient of X-axis or Y-axis polarization is adjusted, such that both centers of the coefficients of X-axis and Y-axis polarizations may be adjusted to a central position of taps of coefficients. Thus, the coefficients of the equalizer may be adjusted accurately, thereby improving filter performance and system stability.

The first adjusting module 103 may be arranged for: acquiring a first value by summing over N instances of the third parameter, the N being an integer greater than 1; determining whether the first value is less than a second threshold; in response to determining that the first value is less than the second threshold, determining that the coefficients are of singularity characteristics. There may be major fluctuation among individual instances of the third parameter. By summing over instances of the third parameter, it may be determined, with increased accuracy, whether the coefficients are of singularity characteristics.

The first strength determining module may be arranged for: determining, using two coefficients of X-axis or Y-axis polarization among the coefficients of the equalizer, strength corresponding to a coefficient of X axis or Y-axis polarization of an order of a filter in the equalizer. The second adjusting module may be arranged for: in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer. Singularity adjustment and center adjustment on the coefficients of the equalizer may further improve filter performance and system stability.

Figure 11:
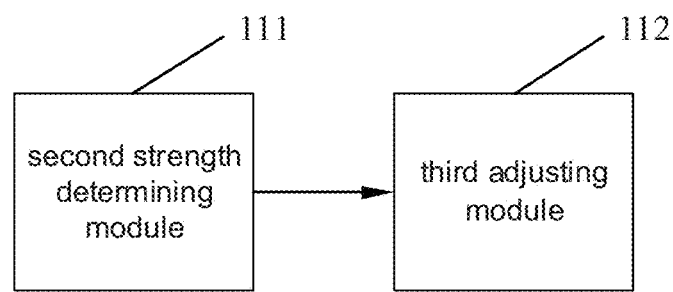
FIG. 11 is a diagram of a structure of a device for adjusting a coefficient of an equalizer according to an embodiment herein.

As shown in FIG. 11, to implement the method according to an embodiment herein, a device for adjusting a coefficient of an equalizer according to an embodiment herein includes a second strength determining module 111 and a third adjusting module 112.

The second strength determining module 111 is arranged for: determining, using two coefficients of X-axis or Y-axis polarization among coefficients of the equalizer, strength corresponding to a coefficient of X axis or Y-axis polarization of an order of a filter in the equalizer.

The third adjusting module 112 is arranged for: in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

The third adjusting module 112 may further include a second parameter acquiring module, a third parameter acquiring module, and a center adjusting module.

The second parameter acquiring module may be arranged for: setting a third parameter as a maximal strength found by searching strength corresponding to a first coefficient of X axis or Y-axis polarization of an order of the filter, and setting a fourth parameter as a first position index corresponding to the third parameter.

The third parameter acquiring module may be arranged for: setting a fifth parameter as a maximal strength found by searching strength corresponding to a second coefficient of X axis or Y-axis polarization of an order of the filter, and setting a sixth parameter as a second position index corresponding to the fifth parameter.

The center adjusting module may be arranged for: in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps. The M may be an integer no less than 1.

Note that by first and second coefficients herein, it indicates but that the coefficients are different coefficients. There is no limitation to a form of a coefficient. Similarly, by first parameter, second parameter, . . . , it indicates but that the parameters are different parameters. There is no limitation to a form of a parameter.

In an actual application, a coefficient used in adjusting the central position of taps of coefficients of X axis as well as a parameter and a set threshold thereof may or may not be identical to that used in adjusting the central position of taps of coefficients of Y axis, depending on an actual condition.

The center adjusting module may be arranged for:
in response to determining that both the fourth and sixth parameters are no greater than a third threshold and both the third and fifth parameters are greater than a fifth threshold, moving the central position of taps of coefficients of X axis or Y-axis polarization of the equalizer to the right by M taps; alternatively, in response to determining that both the fourth and sixth parameters are no less than a fourth threshold and both the third and fifth parameters are greater than the fifth threshold, moving the central position of taps of coefficients of X axis or Y-axis polarization of the equalizer to the left by M taps.

The third threshold, the fourth threshold, the fifth threshold, and the sixth threshold may be set using a result of simulation.

The central position of taps of coefficients of X axis polarization of the equalizer and the central position of taps of coefficients of Y-axis polarization of the equalizer may be adjusted respectively.

The second strength determining module 111 may be arranged for: determining, using two coefficients of X axis polarization among the coefficients of the equalizer, strength corresponding to a coefficient of X axis polarization of an order of a filter in the equalizer. The third adjusting module 112 may be arranged for: in response to determining, using the strength corresponding to a coefficient of X axis polarization of an order of the filter, that a central position of taps of coefficients of the equalizer has deviated, adjusting the central position of taps of coefficients of the equalizer.

The second strength determining module 111 may be arranged for: determining, using two coefficients of Y axis polarization among the coefficients of the equalizer, strength corresponding to a coefficient of Y axis polarization of an order of a filter in the equalizer. The third adjusting module 112 may be arranged for: in response to determining, using the strength corresponding to a coefficient of Y axis polarization of an order of the filter, that a central position of taps of coefficients of the equalizer has deviated, adjusting the central position of taps of coefficients of the equalizer.

The central position of taps of coefficients of X axis polarization may be adjusted with formulas as follows.

Strength corresponding to a first coefficient of X axis polarization of an order of a filter in the equalizer may be determined with a formula as follows.

$$h1(1,col)=(\text{real}(Hxx(1,col)))^2+(\text{imag}(Hxx(1,col)))^2 \quad (4)$$

Strength corresponding to a second coefficient of X axis polarization of an order of a filter in the equalizer may be determined with a formula as follows.

$$h2(1,col)=(\text{real}(Hxy(1,col)))^2+(\text{imag}(Hxy(1,col)))^2 \quad (5)$$

The third parameter may be expressed by a formula as follows.

$$m1=\text{max\_value}(h1(1,col)) \quad (6)$$

The fourth parameter may be expressed by a formula as follows.

$$w1=\text{max\_vahlue\_index}(h1(1,col)) \quad (7)$$

The fifth parameter may be expressed by a formula as follows.

$$m2=\text{max\_value}(h2(1,col)) \quad (8)$$

The sixth parameter may be expressed by a formula as follows.

$$w2=\text{max\_value\_index}(h2(1,col)) \quad (9)$$

The third threshold may be denoted by A1. The fourth threshold may be denoted by A2. The fifth threshold may be denoted by G1. The sixth threshold may be denoted by G2. It may be determined whether the central position has deviated, and the central position may then be adjusted as follows.

When (w1>=A1&&w1<=A2)&& (w2>=A1&&w2<=A2), it means that the central position has not deviated and no adjustment is needed.

When (m1>G1&&w1<=A1)&&(m2>G1&&w2<=A1), it means that the central position has deviated and is to be moved to the right by M taps.

When (m1>G1&&w1>=A2)&&(m2>G1&&w2>=A2), it means that the central position has deviated and is to be moved to the left by M taps.

When none of the conditions is met, the central position may not be adjusted.

Note that in an actual application, as change in a channel is in general slow, the flow/process of adjusting the central position of taps of coefficients of the equalizer may be performed periodically, without impacting system performance. Power consumption by equipment may be reduced as well.

In an actual application, the second strength determining module 111, the third adjusting module 112, the second parameter acquiring module, the third parameter acquiring module, and the center adjusting module may be implemented by a CPU, an MCU, a DSP, or an FPGA in the device for adjusting a coefficient of an equalizer. The second warning module may be implemented by an alarm in the device for adjusting a coefficient of an equalizer.

With the device for adjusting a coefficient of an equalizer according to an embodiment herein, the second strength determining module 111 determines, using two coefficients of X-axis or Y-axis polarization among coefficients of the equalizer, strength corresponding to a coefficient of X axis or Y-axis polarization of an order of a filter in the equalizer. The third adjusting module 112 determines, using the strength corresponding to a coefficient of X axis or Y-axis polarization of an order of the filter, that a central position of taps of coefficients of X axis or Y-axis polarization of the equalizer has deviated, and then adjusts the central position of taps of coefficients of X axis or Y-axis polarization of the equalizer. Thus, the coefficients of the equalizer may be adjusted accurately, thereby improving filter performance and system stability.

Those skilled in the art will know that an embodiment herein may provide a method, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

Accordingly, a transitory or non-transitory computer-readable storage medium according to an embodiment herein has stored therein instructions that, when executed by at least one processor, causes the at least one processor to perform the method for adjusting a coefficient of an equalizer according to embodiments herein.

What described are merely embodiments of the present disclosure, and are not intended to limit the scope of the present disclosure.

The invention claimed is:

1. A method for adjusting a coefficient of an equalizer, comprising:
acquiring a jones matrix with coefficients of an equalizer;
acquiring a parameter of the jones matrix; and
in response to determining, using the parameter of the jones matrix, that the coefficients are of singularity characteristics, adjusting a coefficient of X-axis or Y-axis polarization among the coefficients; wherein the meaning of the coefficients are of singularity characteristics refers to a signal of X-axis polarization and a signal of Y-axis polarization converge to each other in terms of polarization.

2. The method according to claim 1, wherein the acquiring a parameter of the jones matrix comprises:
acquiring, by performing a mathematical operation on the jones matrix, a first parameter, a second parameter, and a third parameter, the first parameter representing strength of a signal of X-axis polarization, the second parameter representing strength of a signal of Y-axis polarization, the third parameter representing an angle between the signal of X-axis polarization and the signal of Y-axis polarization.

3. The method according to claim 2, wherein the determining, using the parameter of the jones matrix, that the coefficients are of singularity characteristics comprises:
determining whether the third parameter is less than a first threshold; in response to determining that the third parameter is less than the first threshold, determining that the coefficients are of singularity characteristics; alternatively,
acquiring a first value by summing over N instances of the third parameter, the N being an integer greater than 1; determining whether the first value is less than a second threshold; in response to determining that the first value is less than the second threshold, determining that the coefficients are of singularity characteristics.

4. The method according to claim 1, further comprising:
in response to determining that the coefficients are of singularity characteristics, before the adjusting a coefficient of X-axis or Y-axis polarization among the coefficients,
generating a warning of singularity.

5. The method according to claim 3, wherein the adjusting a coefficient of X-axis or Y-axis polarization among the coefficients comprises:
in response to determining that the first parameter is greater than the second parameter, performing singularity alteration on the coefficient of X-axis polarization, and setting the coefficient of X-axis polarization having gone through the singularity alteration as the coefficient of Y-axis polarization; alternatively,
in response to determining that the first parameter is less than the second parameter, performing singularity alteration on the coefficient of Y-axis polarization, and setting the coefficient of Y-axis polarization having gone through the singularity alteration as the coefficient of X-axis polarization.

6. The method according to claim 5, wherein the performing singularity alteration on the coefficient of X-axis polarization, and setting the coefficient of X-axis polarization having gone through the singularity alteration as the coefficient of Y-axis polarization comprises:

$Hyy(1,col)=\mathrm{conj}(Hxx(1,n+1-col))$;

$Hyx(1,col)=-\mathrm{conj}(Hxy(1,n+1-col))$;

wherein the conj represents conjugation, the n represents an order of a filter in the equalizer, and the col takes on a value of 1, 2, . . . , or n.

7. The method according to claim 5, wherein the performing singularity alteration on the coefficient of Y-axis polarization, and setting the coefficient of Y-axis polarization having gone through the singularity alteration as the coefficient of X-axis polarization comprises:

$Hxx(1,col)=\mathrm{conj}(Hyy(1,n+1-col))$;

$Hxy(1,col)=-\mathrm{conj}(Hyx(1,n+1-col))$;

wherein the conj represents conjugation, the n represents an order of a filter in the equalizer, and the col takes on a value of 1, 2, . . . , or n.

8. The method according to claim 1, further comprising:
determining, using two coefficients of X-axis or Y-axis polarization among the coefficients of the equalizer, strength corresponding to a coefficient of X axis or Y-axis polarization of an order of a filter in the equalizer; and
in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

9. The method according to claim 8, wherein the in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer comprises:
setting a third parameter as a maximal strength found by searching strength corresponding to a first coefficient of X axis or Y-axis polarization of an order of the filter, and setting a fourth parameter as a first position index corresponding to the third parameter;
setting a fifth parameter as a maximal strength found by searching strength corresponding to a second coefficient of X axis or Y-axis polarization of an order of the filter, and setting a sixth parameter as a second position index corresponding to the fifth parameter; and
in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps, the M being an integer no less than 1.

10. The method according to claim 9, wherein the in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps comprises:
in response to determining that both the fourth and sixth parameters are no greater than a third threshold and both the third and fifth parameters are greater than a fifth threshold, moving the central position of taps of coefficients of X axis or Y-axis polarization of the equalizer to the right by M taps; alternatively,
in response to determining that both the fourth and sixth parameters are no less than a fourth threshold and both the third and fifth parameters are greater than the fifth threshold, moving the central position of taps of coefficients of X axis or Y-axis polarization of the equalizer to the left by M taps.

11. A non-transitory computer-readable storage medium, storing therein instructions which when being executed, cause at least one processor to execute at least one of:
the method according to claim 1,
and a method for adjusting a coefficient of an equalizer, comprising:
determining, using two coefficients of X-axis or Y-axis polarization among coefficients of the equalizer, strength corresponding to a coefficient of X axis or Y-axis polarization of an order of a filter in the equalizer; and
in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

12. The method according to claim 2, further comprising:
determining, using two coefficients of X-axis or Y-axis polarization among the coefficients of the equalizer, strength corresponding to a coefficient of X axis or Y-axis polarization of an order of a filter in the equalizer; and
in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

13. A method for adjusting a coefficient of an equalizer, comprising:
determining, using two coefficients of X-axis polarization among coefficients of the equalizer, strength corresponding to a coefficient of X axis polarization of an order of a filter in the equalizer; and
in response to determining, using the strength corresponding to a coefficient of X axis polarization of an order of the filter, that a central position of taps of coefficients of X axis polarization of the equalizer has deviated, adjusting the central position of taps of coefficients of X axis polarization of the equalizer;
or,
determining, using two coefficients of Y-axis polarization among coefficients of the equalizer, strength corresponding to a coefficient of Y-axis polarization of an order of a filter in the equalizer; and in response to determining, using the strength corresponding to a coefficient of Y-axis polarization of an order of the filter, that a central position of taps of coefficients of Y-axis polarization of the equalizer has deviated, adjusting the central position of taps of coefficients of Y-axis polarization of the equalizer.

14. The method according to claim 13, wherein the in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer comprises:
 setting a third parameter as a maximal strength found by searching strength corresponding to a first coefficient of X axis or Y-axis polarization of an order of the filter, and setting a fourth parameter as a first position index corresponding to the third parameter;
 setting a fifth parameter as a maximal strength found by searching strength corresponding to a second coefficient of X axis or Y-axis polarization of an order of the filter, and setting a sixth parameter as a second position index corresponding to the fifth parameter; and
 in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps, the M being an integer no less than 1.

15. The method according to claim 14, wherein the in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps comprises:
 in response to determining that both the fourth and sixth parameters are no greater than a third threshold and both the third and fifth parameters are greater than a fifth threshold, moving the central position of taps of coefficients of X axis or Y-axis polarization of the equalizer to the right by M taps; alternatively,
 in response to determining that both the fourth and sixth parameters are no less than a fourth threshold and both the third and fifth parameters are greater than the fifth threshold, moving the central position of taps of coefficients of X axis or Y-axis polarization of the equalizer to the left by M taps.

16. A device for adjusting a coefficient of an equalizer, comprising a first jones matrix acquiring module, a first parameter acquiring module, and a first adjusting module,
 wherein the first jones matrix acquiring module is arranged for: acquiring a jones matrix with coefficients of an equalizer,
 wherein the first parameter acquiring module is arranged for: acquiring a parameter of the jones matrix,
 wherein the first adjusting module is arranged for: in response to determining, using the parameter of the jones matrix, that the coefficients are of singularity characteristics, adjusting a coefficient of X-axis or Y-axis polarization among the coefficients; wherein the meaning of the coefficients are of singularity characteristics refers to a signal of X-axis polarization and a signal of Y-axis polarization converge to each other in terms of polarization.

17. The device according to claim 16, further comprising a first warning module arranged for: in response to determining that the coefficients are of singularity characteristics, before the coefficient of X-axis or Y-axis polarization among the coefficients is adjusted, generating a warning of singularity.

18. The device according to claim 16, further comprising a first strength determining module and a second adjusting module,
 wherein the first strength determining module is arranged for: determining, using two coefficients of X-axis or Y-axis polarization among the coefficients of the equalizer, strength corresponding to a coefficient of X axis or Y-axis polarization of an order of a filter in the equalizer,
 wherein the second adjusting module is arranged for: in response to determining, using the strength corresponding to a coefficient of X axis or Y-axis polarization of an order of the filter, that a central position of taps of coefficients of X axis or Y-axis polarization of the equalizer has deviated, adjusting the central position of taps of coefficients of X axis or Y-axis polarization of the equalizer.

19. A device for adjusting a coefficient of an equalizer, comprising a second strength determining module, and a third adjusting module,
 wherein the second strength determining module is arranged for: determining, using two coefficients of X-axis polarization among coefficients of the equalizer, strength corresponding to a coefficient of X axis polarization of an order of a filter in the equalizer,
 wherein the third adjusting module is arranged for: in response to determining, using the strength corresponding to a coefficient of X axis polarization of an order of the filter, that a central position of taps of coefficients of X axis polarization of the equalizer has deviated, adjusting the central position of taps of coefficients of X axis polarization of the equalizer;
 or,
 wherein the second strength determining module is arranged for: determining, using two coefficients of Y-axis polarization among coefficients of the equalizer, strength corresponding to a coefficient of Y-axis polarization of an order of a filter in the equalizer,
 wherein the third adjusting module is arranged for: in response to determining, using the strength corresponding to a coefficient of Y-axis polarization of an order of the filter, that a central position of taps of coefficients of Y-axis polarization of the equalizer has deviated, adjusting the central position of taps of coefficients of Y-axis polarization of the equalizer.

20. The device according to claim 19, wherein the third adjusting module further comprises a second parameter acquiring module, a third parameter acquiring module, and a center adjusting module,
 wherein the second parameter acquiring module is arranged for: setting a third parameter as a maximal strength found by searching strength corresponding to a first coefficient of X axis or Y-axis polarization of an order of the filter, and setting a fourth parameter as a first position index corresponding to the third parameter,
 wherein the third parameter acquiring module is arranged for: setting a fifth parameter as a maximal strength found by searching strength corresponding to a second coefficient of X axis or Y-axis polarization of an order of the filter, and setting a sixth parameter as a second position index corresponding to the fifth parameter, wherein the center adjusting module is arranged for: in response to determining, using the third parameter, the fourth parameter, the fifth parameter, the sixth parameter, and a preset condition, that the central position of taps of coefficients of X axis or Y-axis polarization of the equalizer has deviated, moving the central position of taps of coefficients of X axis or Y-axis polarization of the equalizer to the left or to the right by M taps, the M being an integer no less than 1.

* * * * *